US009661508B2

(12) United States Patent
Siomina et al.

(10) Patent No.: US 9,661,508 B2
(45) Date of Patent: May 23, 2017

(54) METHODS AND APPARATUS FOR DETERMINING A SIGNAL ESTIMATE BY SCALING

(71) Applicant: Telefonaktiebolaget L M Ericsson (publ), Stockholm (SE)

(72) Inventors: Iana Siomina, Solna (SE); Bengt Lindoff, Bjärred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 581 days.

(21) Appl. No.: 13/891,442

(22) Filed: May 10, 2013

(65) Prior Publication Data

US 2013/0301451 A1 Nov. 14, 2013

Related U.S. Application Data

(60) Provisional application No. 61/646,753, filed on May 14, 2012.

(51) Int. Cl.
*G08C 15/00* (2006.01)
*H04W 24/00* (2009.01)
(Continued)

(52) U.S. Cl.
CPC .......... *H04W 24/00* (2013.01); *H04B 17/318* (2015.01); *H04B 17/336* (2015.01); *H04B 17/382* (2015.01)

(58) Field of Classification Search
USPC ................ 370/203–210, 235–260, 328–342; 375/147–340; 455/435–450, 520–525,
(Continued)

(56) References Cited

U.S. PATENT DOCUMENTS 6,931,050 B1 * 8/2005 Bottomley ..................... 375/130
7,269,205 B2 * 9/2007 Wang .............................. 375/148
(Continued)

FOREIGN PATENT DOCUMENTS

CN 1792042 A 6/2006
CN 102388660 A 3/2012
(Continued)

OTHER PUBLICATIONS

Quddus, A. et al., "SIR Estimation on Common Pilot Channel with Knowledge of Data to Pilot Power Ratio for Closed Loop Power Control in WCDMA FDD Downlink", IEEE 60th Vehicular Technology Conference, Sep. 26, 2004, pp. 865-869, vol. 2.
(Continued)

*Primary Examiner* — Man Phan
(74) *Attorney, Agent, or Firm* — Coats & Bennett, P.L.L.C.

(57) ABSTRACT

Methods and apparatus are disclosed for estimating a signal by a wireless device in a wireless communication system. The wireless device obtains a scaling factor that describes a relation between signal estimates for first and second signals of a first type. The wireless device further obtains a reference signal estimate that comprises a signal estimate for a first signal of a second type. The wireless device then selectively determines at the wireless device a signal estimate for a second signal of the second type by scaling the reference signal estimate by the scaling factor. The first signals of the first and second type are associated with a first radio network node. The second signals of the first and second type are associated with a second radio network node.

23 Claims, 14 Drawing Sheets

(51) Int. Cl.
*H04B 17/318* (2015.01)
*H04B 17/336* (2015.01)
*H04B 17/382* (2015.01)

(58) Field of Classification Search
USPC .................................................. 455/403–422
See application file for complete search history.

(56) References Cited

U.S. PATENT DOCUMENTS

| | | | |
|---|---|---|---|
| 7,561,637 B2* | 7/2009 | Jonsson | H04L 5/023 370/203 |
| 7,627,336 B2* | 12/2009 | Carlsson et al. | 455/522 |
| 7,702,355 B2* | 4/2010 | Jonsson et al. | 455/525 |
| 8,094,701 B2* | 1/2012 | Cozzo | H04L 25/0224 375/147 |
| 8,130,862 B2* | 3/2012 | Forenza et al. | 375/295 |
| 8,311,143 B2* | 11/2012 | Ray et al. | 375/267 |
| 8,385,965 B2* | 2/2013 | Jonsson et al. | 455/522 |
| 8,611,477 B1* | 12/2013 | Nabar et al. | 375/345 |
| 8,638,744 B2* | 1/2014 | Wang | H04J 11/0056 370/329 |
| 8,855,580 B2* | 10/2014 | Dent et al. | 455/78 |
| 8,873,413 B2* | 10/2014 | Jang | H04W 24/10 370/252 |
| 8,958,371 B2* | 2/2015 | Gaal | H04W 72/082 370/235 |
| 9,204,317 B2* | 12/2015 | Hammarwall | H04W 24/02 |
| 2008/0285433 A1 | 11/2008 | Akita et al. | |
| 2009/0325509 A1* | 12/2009 | Mattisson et al. | 455/75 |
| 2011/0249619 A1* | 10/2011 | Yu | H04B 7/024 370/328 |
| 2013/0201950 A1 | 8/2013 | Wang et al. | |
| 2014/0376397 A1 | 12/2014 | Han et al. | |

FOREIGN PATENT DOCUMENTS

| | | |
|---|---|---|
| CN | 102404800 A | 4/2012 |
| EP | 1480350 A1 | 11/2004 |
| EP | 2611258 A1 | 7/2013 |
| WO | 2009059986 A2 | 5/2009 |
| WO | 2012034405 A1 | 3/2012 |

OTHER PUBLICATIONS

Ericsson et al., "Performing measurements in the presence of aggressor interference", 3GPP TSG-RAN WG4 Meeting #63, May 21-25, 2012, Prague, Czech Republic, R4-123059.

3GPP. "Technical Specification Group Radio Access Network; Evolved Universal Terrestrial Radio Access (E-UTRA); Radio Resource Control (RRC); Protocol specification (Release 10)" 3GPP TS 36.331 V10.5.0. Mar. 2012. 3GPP, Sophia Antipolis, France.

3GPP. "Technical Specification Group Radio Access Network; Evolved Universal Terrestrial Radio Access (E-UTRA); Physical Channels and Modulation (Release 10)." 3GPP TS 36.211 V10.4.0. Dec. 2011. 3GPP, Sophia Antipolis, France.

Search Report, Application No. 201380025304.7. Date of mailing: Nov. 20, 2015. SIPO: Beijing, CN.

* cited by examiner

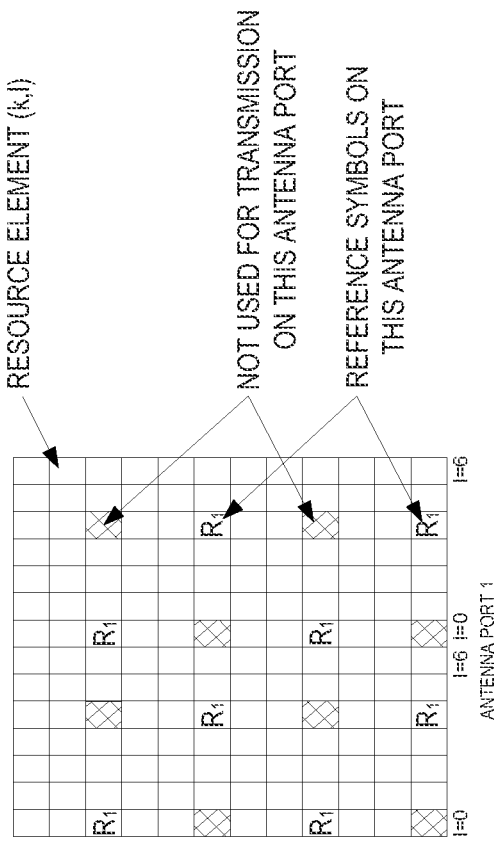
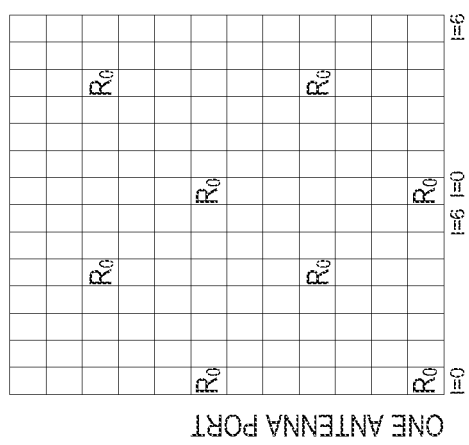
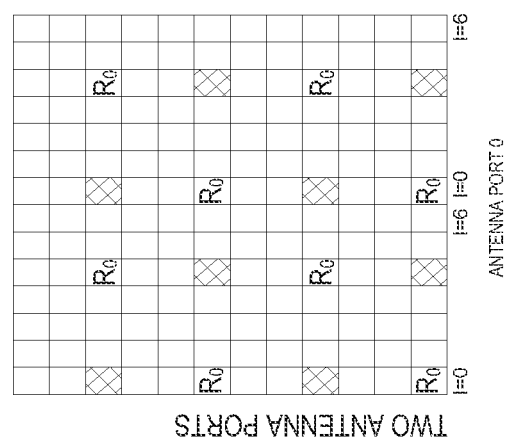
FIG. 4A

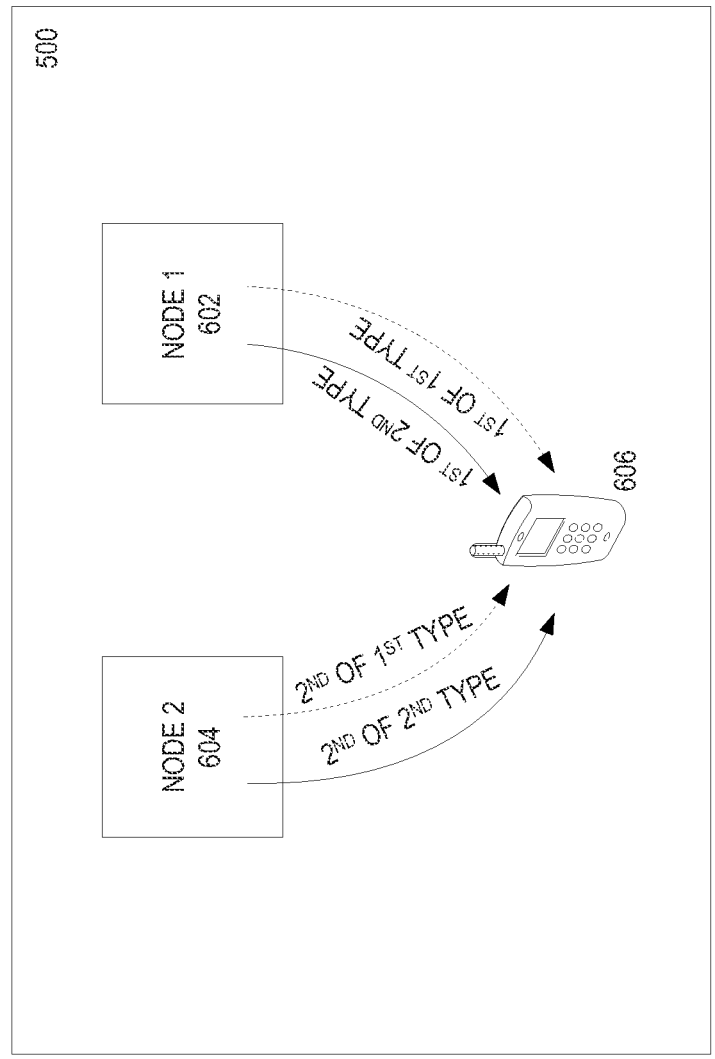

METHODS AND APPARATUS FOR DETERMINING A SIGNAL ESTIMATE BY SCALING

PRIORITY CLAIM

The present application claims priority to U.S. Provisional Application 61/646,753, which was filed on May 14, 2012 and is incorporated by reference herein in its entirety.

TECHNICAL FIELD

The present invention relates generally to methods and apparatus in a wireless communication system and, more specifically, to determining a signal estimate in such a system.

BACKGROUND

In 3GPP standards, heterogeneous network deployments have been defined as deployments where low-power nodes of different transmit powers are placed throughout a macro-cell layout. Examples of low-power nodes include micro, pico, and femto nodes. Heterogeneous network deployments provide capacity extension in certain areas such as traffic hotspots. A traffic hotspot is a small geographical area with a higher user density and/or higher traffic intensity than the surrounding area. Placing a low-power node such as a pico node at a traffic hotspot can adapt a network according to traffic needs and environment, thus enhancing the network's performance. However, interference characteristics in a heterogeneous deployment are significantly different than in a homogeneous deployment, in both downlink and uplink. Also in a heterogeneous network deployment, traffic distribution is often non-uniform and uplink transmissions generally experience high interference due to the co-existence of both small and large cells. It is often challenging to ensure efficient network operation and superior user experience in a heterogeneous network deployment. One common problem related to heterogeneous networks is that it is often difficult for a wireless device to perform measurements on signals transmitted from a low-power node in a heterogeneous network due to interference from neighboring high-power nodes. Yet accurate signal estimates and measurements are needed for important functionalities such as cell search, cell identification, handover, Radio Link Management (RLM) and Radio Resource Management (RRM), etc.

It is generally known that a received pilot power estimate for a neighbor cell may be obtained by applying a scaling factor to the estimated received synchronization channel power of this neighbor cell. The scaling factor may be calculated as a ratio of the estimated received pilot power in the serving cell over the estimated received synchronization channel power of the serving cell. In this approach, the scaling factor is calculated as a ratio of signals of two different types, which may have no correlation with each other. Further such approach is not applicable in a cell that does not transmit pilot signals, for example, in a network where new carrier types are used and no cell-specific reference signals (CRS) are transmitted.

There is a need for improved methods and apparatus that can be used to obtain reliable and accurate signal estimates for a cell, both serving and neighboring, that may be served by a low-power node in a high interfering environment.

SUMMARY

One or more embodiments herein provide methods and apparatus for determining a signal estimate based on a reference estimate and a scaling factor. The methods and apparatus disclosed herein prove particularly advantageous for determining signal estimates in a high interference environment, such as a heterogeneous network deployment. The methods and apparatus disclosed herein are resource efficient. For example, they can be used along with joint channel estimation, which achieves efficient resource utilization and boosts receiver performance as compared to interference cancellation. The methods and apparatus disclosed herein also provide flexible approaches to signal estimations, such as obtaining channel estimates, received signal power estimates, and received signal quality estimates.

In some embodiments, a method is implemented by a wireless device in a wireless communication system for signal estimation. The method comprises the following steps. First, a scaling factor that describes a relation between signals estimates for first and second signals of a first type is obtained. Second, a reference signal estimate that comprises a signal estimate for a first signal of a second type is also obtained. Third, at the wireless device, a signal estimate for a second signal of the second type is selectively determined by scaling the reference signal estimate by the scaling factor. Here, the first signals of the first and second type are associated with a first radio network node. The second signals of the first and second type are associated with a second radio network node.

In some embodiments, the first and second signals of the first type are associated with certain time and/or frequency resources with a specific property.

In some embodiments, the signal estimate for a signal may be referred to one of the following: a channel estimate of a channel associated with the signal, a power estimate of the signal and a signal quality estimate of the signal.

In some embodiments, the step of obtaining the scaling factor comprises receiving the first and second signals of the first type, computing the signal estimates for those signals, and calculating the scaling factor as a ratio of the computed signal estimate for the second signal of the first type to the computed signal estimate for the first signal of the first type. In some embodiments, the signal estimates comprises determining if the first and second signals of the first type are substantially time-aligned. If so, a joint channel estimation approach is selected from among multiple possible channel estimation approaches for estimating the channels associated with those signals.

In some embodiments, the method of signal estimation further comprises receiving information from a network node. The received information comprises at least one of the following: information that indicates the scaling factor, information that indicates an adjustment to the scaling factor, and information that assists the wireless device to determine whether to apply the scaling factor or the adjustment to the scaling factor for determining the signal estimate for the second signal of the second type. When the scaling factor is received from the network node, the wireless device obtains the scaling factor by retrieving the scaling factor from the received information.

In some embodiments, the method of signal estimation implemented at the wireless device further comprises transmitting to a network node capability information indicating whether or not the wireless device is capable of determining the signal estimate for the second signal of the second type by the scaling.

In some embodiments, the wireless device selectively determines the signal estimate for the second signal of the second type by the scaling in response to the wireless device determining that a density of the second signal of the second type in time, frequency, or both is lower than a defined threshold. In some embodiments, the wireless device selectively determines the signal estimate for the second signal in response to the wireless device determining that the first radio network node is functioning as an aggressor with respect to the second radio network node. In some embodiments, the wireless device selectively determines the signal estimate for the second signal of the second type in response to the wireless device being in a low power or low activity state. In some embodiments, in response to the wireless device determining that the first signal of the second type is not available for measurement at the wireless device, the wireless device determines the signal estimate for the second signal of the second type by obtaining the signal estimate for the first signal of the second type as a virtual signal estimate that is generally associated with a signal of the second type.

In some embodiments, the method of signal estimation further comprises obtaining a correction factor that describes a relation between the first and second types of signals at the first and second radio network nodes and adjusting the scaling factor by the correction factor. In some embodiments, the correction factor is computed based one or more pieces of information or data listed as follows: (1) a difference between a first power ratio and a second power ratio where the first power ratio is between the first signal of the first type and the first signal of the second type and the second power ration is between the second signal of the first type and the second signal of the second type; (2) bandwidth information associated with the first and second radio network nodes; (3) power classes associated with the first and second radio network nodes; and (4) the number of transmit antennas associated with the first and second radio network nodes.

In some embodiments, the signals of the first type mentioned above are synchronization signals and the signals of the second type are cell-specific reference signals. In other embodiments, the signals of the first type mentioned above are cell-specific reference signals and the signals of the second type are synchronization signals.

In some embodiments, a network node in a wireless communication system is configured to provide information to the wireless device to assist the signal estimation process. The method implemented by the network node comprises selectively generating at least one of a plurality of information or data and transmitting the generated information to the wireless device. The plurality of information or data include: (1) information that indicates a scaling factor, (2) information that indicates an adjustment to the scaling factor, and (3) information that assists a wireless device to device whether to apply the scaling factor or the adjustment to the scaling factor for determining a signal estimate. The scaling factor describes a relation between a first and second signal of the same type but are respectively associated with a first and second radio network nodes.

In some embodiments, the step of selectively generating one of the above listed information or data in response to receiving capability information from the wireless device indicating that the wireless device is capable of applying the scaling factor or the adjustment to the scaling factor for determining the signal estimate.

In some embodiments, the method implemented by the network node further comprises transmitting capability information to a node indicating whether or not the network node is capable of generating one of the above listed information or data and transmitting the generated information.

Also disclosed in the present application are wireless devices and network nodes structurally configured to implement and carry out the above described processes and methods.

Of course, the present invention is not limited to the features, advantages, and contexts summarized above, and those familiar with the wireless communication technology will recognize additional features and advantages upon reading the following detailed description and upon viewing the accompanying drawings.

BRIEF DESCRIPTION OF THE DRAWINGS

FIGS. 4a-4b illustrates an exemplary mapping of cell-specific reference signals (CRS's) to a resource element.

FIG. 5 illustrates an exemplary wireless communications system in which a wireless device receives signals from two radio network nodes.

DETAILED DESCRIPTION

Figure 1:
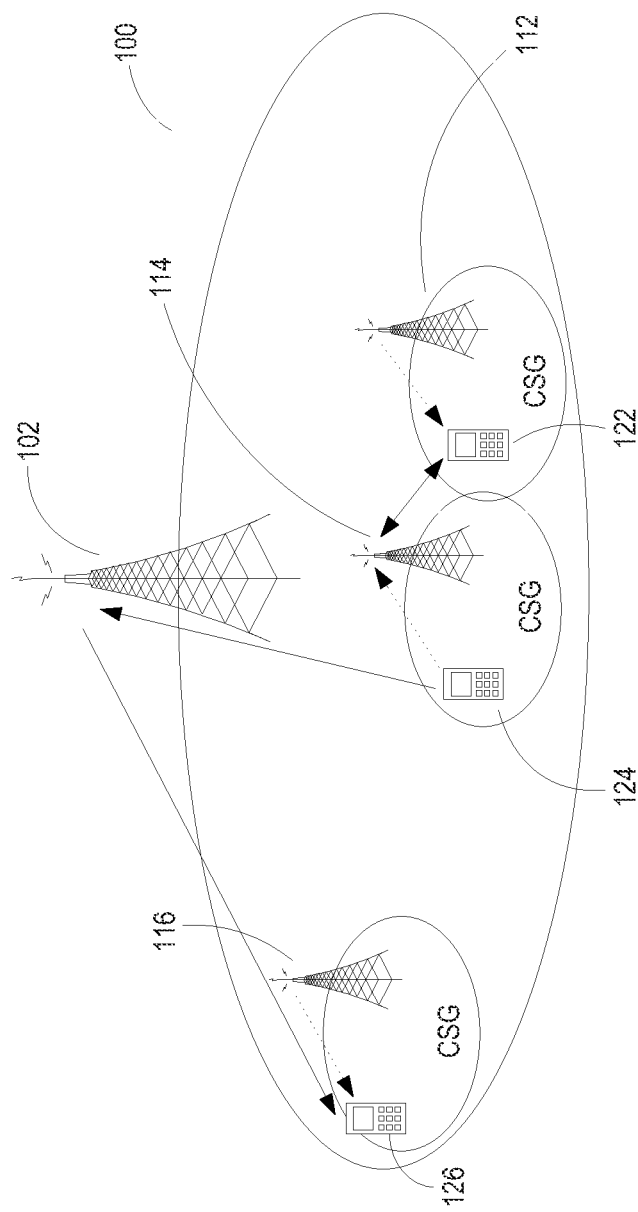
FIG. 1 illustrates various interference scenarios in a heterogeneous network deployment.

In the present disclosure, certain terminologies or technical phrases are used as examples for illustration purposes. They are not to be construed as limiting the disclosure to one technology or standard.

For example, the terms wireless device and user equipment (UE) are used interchangeably in the description. A UE may comprise any device equipped with a radio interface and capable of at least receiving a radio signal from a radio network node and/or another wireless device. The UE may also be capable of receiving and decoding a radio signal form a remote node. The UE may also be capable of generating and transmitting a radio signal. Note that even some radio network nodes may also be equipped with a UE-like interface. Some examples of "UE" that are to be understood in a general sense are mobile, iPhone, PDA, laptop, sensor, fixed relay, mobile relay, any radio network node equipped with a UE-like interface (e.g., small RBS, eNodeB, femto BS, LMU, etc.). A wireless device may be capable of operating in one or more frequencies and in one or more radio access technologies (RATs) (e.g., an example dual-mode user equipment may operate with any two: WiFi, LTE/LTE-A, HSPA, GSM), and some devices may also support operation in multiple frequencies and/or multiple RATs in parallel (e.g., wireless devices configured with carrier aggregation). A wireless device may also support multi-tag (i.e., multi-link) operation on the same frequency, e.g., with Coordinated Multi-Point (CoMP) operation. A wireless device may be served by a serving cell (e.g., a Primary Cell (PCell)), and one or more Secondary Cells (SCells) in carrier aggregation. For a single wireless device, UE may have one Primary Cell (PCell) and one or more Secondary Cells (SCells). A cell can also be a virtual cell associated with a transmit node, and it may or may not share the same cell ID with another transmit node.

A radio network node is a radio node comprising an apparatus transmitting at least one radio signal and located in a radio communications network. It may or may not generate transmitted signal sequences. For example, it may be a radio base station, relay, beacon device, remote radio unit (RRU). Alternatively it can also be a transmitting antenna or a remote radio head (RRH), or simply a repeater.

A radio network node may or may not create its own cell. A radio network node may share a cell with another radio node or operate in a cell sector (a logical or geographical part of a cell, which in some embodiments may also in a generic way be referred to as a "cell"). A radio network node may be associated with more than one cell. A radio network node may be capable of operating in one or more frequencies and in one or more RATs (e.g., a multi-standard radio base station (MSR BS), and be capable of supporting any one or more of the following radio access technologies: WiFi, LTE/LTE-A, WCDMA, HSPA, GSM/EDGE/GPRS. Some radio network nodes may also support operation in multiple frequencies and/or multiple RATs in parallel (e.g., serving a wireless device configured with carrier aggregation or even serving multiple wireless devices in different frequencies and/or RATs). A radio network node may be equipped with multiple antennas that are either co-located and/or distributed. A radio network node may also support multi-tag (also known as multi-link) operation on the same frequency, e.g., with CoMP.

A victim (also referred to as target) may comprise a radio transmission (e.g., signal or a channel) being received or a specific time- and/or frequency resource (which may potentially be used for radio communication) that are subject or may be subject to interference and noise generated by other sources. In some embodiments, the term "victim" may also refer to an entity (e.g., a cell, a transmitting wireless device, or a transmitting radio network node) associated with the signal(s) or channel(s) being received or measured that are subject or may be subject to interference and noise generated by other sources. A victim signal/channel may be a downlink signal/channel transmitted by a radio network node or a signal/channel transmitted between two wireless devices, e.g., in device-to-device communication. Some examples of victim signals and channels include physical signals (e.g., broadcast or unicast physical signals, reference signals, CRS, PRS (positioning reference signal), DM-RS (dedicated modulation reference signal), synchronization signals in general, MBSFN reference signals (RS), PSS, SSS, etc.), physical channels (broadcast or multicast channel, PBCH, control channel, PDCCH, PCFICH, PHICH, PUCCH, data channel, PDSCH, PUSCH), logical channels (e.g., a channel carrying system information or paging information).

An aggressor is a source of the interference or noise that impact the victim. An aggressor may be a radio transmission (e.g., a signal or a channel) or an entity associated with the aggressor transmission (e.g., a cell or any transmitting radio node). An aggressor signal/channel may be a downlink signal/channel or a signal/channel between two radio nodes, including device-to-device communication. Some examples of aggressor signals and channels include physical signals (e.g., broadcast or unicast physical signals, reference signals, CRS, PRS, DM-RS, synchronization signals, MBSFN RS, PSS, SSS, etc.), physical channels (broadcast or multicast channel, PBCH, control channel, PDCCH, PCFICH, PHICH, PUCCH, data channel, PDSCH, PUSCH), logical channels (e.g., a channel carrying system information or paging information).

A network node may be any radio network node or a network node not comprised in a radio network (e.g., in a core network). Some non-limiting examples of a network node are base station, eNodeB, radio network controller, positioning node, MME, Self-Organizing Network (SON) node, Minimizing of Drive Tests (MDT) node, a coordinating node, and Operation & Maintenance (O&M) node.

The term "positioning node" may refer to a node with positioning functionality. For example, in LTE, the term "positioning node" may be understood as referring to a positioning platform in the user plane (e.g., Secure User Plane Location (SUPL) Location Platform (SLP) in LTE) or a positioning node in the control plane (e.g., Evolved Serving Mobile Location Center (E-SMLC) in LTE). SUPL Location Platform (SLP) may also consist of SUPL Location Center (SLC) and SUPL positioning center (SPC), where SPC may also have a proprietary interface with E-SMLC. Positioning functionalities may be split among two or more nodes. For example, there may be a gateway node between Location Measurement Units (LMUs) and E-SMLC, where the gateway node may be a radio base station or another network node. In this case, the term "positioning node" may relate to E-SMLC and the gateway node. In a testing environment, a positioning node may be simulated or emulated by test equipment.

The term "coordinating node" used herein is a network and/or node that coordinate radio resources or radio transmissions with one or more radio nodes. Some examples of coordinating nodes are network monitoring and configuration node, OSS node, O&M, MDT node, SON node, positioning node, MME, a gateway node such as Packet Data Network Gateway (P-GW) or Serving Gateway (S-GW) network node or femto gateway node, a macro node coordinating smaller radio nodes associated with it, eNodeB coordinating resources with other eNodeBs, etc.

The signaling described herein is either via direct links (e.g., lower-layer signals such as an indication over a physical control channel) or logical links (e.g. via higher-layer protocols). Signaling may also be transparent via one or more network and/or radio nodes, e.g., signaling from a coordinating node comprised in a core network and intended for a wireless device may pass another network node, e.g., an eNodeB serving the wireless device.

The term "subframe" used in the embodiments described herein is an example resource in the time domain, and in a more general case it may be any pre-defined time instance or time period (e.g., TTI, radio frame, slot, symbol, etc.).

The described embodiments are not limited to LTE, but may apply with any Radio Access Network (RAN), single- or multi-RAT. Some other RAT examples are LTE-Advanced (LTE-A), UMTS, WCDMA, HSPA, GSM/EDGE/GPRS, cdma2000, WiMAX, and WiFi. The embodiments described herein may be independent embodiments or any embodiment may be combined in any combination with at least one other embodiment (or applied together) fully or in part.

Referring now to the drawings, FIG. 1 illustrates a heterogeneous network deployment 100, in which three low-power nodes, 112, 114, 116, are deployed within a macro cell served by a high-power node 102. Each of the low-power nodes 112, 114, and 116 serves a closed subscriber group (CSG) cell. In FIG. 1, there are three wireless devices, 122, 124, and 126. The wireless device 122 is served by the network node 114 but experiences interference from the network node 112. The wireless device 124 is served by the macro node 102 and its uplink transmissions to the macro node 102 interfere with the nearby network node 114. The wireless device 126 is also served by the macro node 102. The downlink transmissions from the macro node 102 to the wireless device 126 are shown as being interfered by downlink transmissions from the nearby network node 116. The various interfering scenarios illustrated in FIG. 1 demonstrate some of the challenges in achieving efficient network operation and superior user experience in a heterogeneous network deployment.

Figure 2:
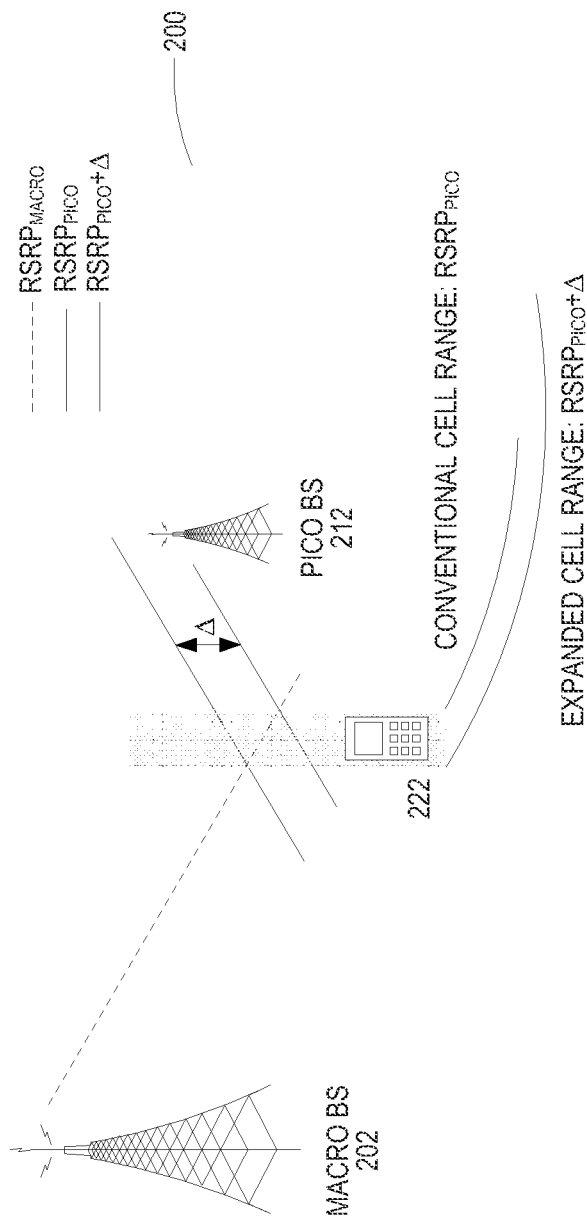
FIG. 2 illustrates cell range expansion in a heterogeneous network deployment.

FIG. 2 illustrates a different challenge in managing or controlling interference in a heterogeneous network 200. FIG. 2 depicts a macro base station 202 and a pico base station 212. A wireless device 222 is located between the macro base station 202 and the pico base station 212. A conventional cell range is defined as the boundary where the Reference Signal Received Power (RSRP) measurement from the macro base station ($RSRP_{macro}$) equals the RSRP measurement from the pico base station ($RSPR_{pico}$). Cell boundary can be also defined based on the path loss or path gain experienced by the uplink transmissions from the wireless device to the macro base station 202 and to the pico base station 212. For example, a new cell boundary may be defined as the boundary where the path loss experienced by the uplink transmission from the wireless device 222 to the pico base station and the path loss experienced by the uplink transmission from the wireless device 222 to the macro base station are equal. Compared to the conventional cell range, the cell boundary defined based on path loss may be viewed as a cell range expansion (CRE). The pico cell range is now expanded by a parameter $\Delta$. In other words, the wireless device 222 selects the pico cell if $RSRP_{pico}+\Delta \geq RSRP_{macro}$. Usually RSRP and RSRQ measurements are performed on cell-specific reference signals (CRS).

To facilitate measurements in the extended cell range or the CRE zone shown in FIG. 2 where high interference is expected, inter-cell interference cancellation (ICIC) techniques and/or enhanced inter-cell interference cancellation (eICIC) techniques are often used. Examples of ICIC or eICIC techniques include specifying transmit patterns for a radio network node and restricting measurement patterns for wireless devices.

Almost Blank Subframe ABS patterns are transmit patterns used by a radio network node to determine when to transmit radio signals. ABS pattern is generally cell-specific and specifies low-power and/or low-transmission activity subframes for a radio network node. ABS patterns may be exchanged between eNodeBs via an X2 interface. But they are not signalled to the UEs, unlike the restricted measurement patterns.

Because an ABS subframe defined for an interfering node indicates a time period of low power and/or low transmission activity at the interfering radio network node, an ABS subframe is a time period suitable for a UE to perform measurements on another radio network node. Restricted measurement patterns are often specified in tandem with the ABS subframes (or Multicast/Broadcast over Single Frequency Network (MBSFN) subframes) that are defined for interfering eNodeBs. Restricted measurement patterns (also denoted as "time domain resource restriction patterns" [3GPP Technical Specification TS 36.331]) are configured to inform a UE a subset of subframes that may be suitable for performing measurements.

Restricted measurement patterns are not solely used by UEs experiencing interference. Restricted measurement patterns can also be configured for UEs experiencing good interference conditions. Similarly, receiving a restricted measurement pattern is not necessarily an indication of expected poor signal quality. For example, a measurement pattern may be configured for a UE in the cell range expansion (CRE) zone where typically high interference is expected. A measurement pattern may also be configured for UEs located close to the serving base station where the signal quality is typically good, for the purpose of enabling a higher-rank transmission mode (e.g., rank-two transmissions).

In general, restricted measurement patterns are UE-specific, although it is known in prior art that such patterns may be broadcast or multicast to a plurality of UEs. Three measurement patterns are currently specified in the standards to enable restricted measurements: serving-cell pattern for Radio Link Management (RLM) and Radio Resource Management (RRM) measurements, neighbour-cell pattern for RRM measurements, serving-cell pattern for Channel State Information (CSI) measurements.

Measurement patterns can be viewed as instructions to a UE about when to perform measurements and on which radio network node. A UE is generally aware of the serving cell configuration. However, a UE not only receives/sends data from the serving cell and performs measurements for the serving cell, it also performs measurements on neighbour cells for mobility reasons. Mobility decisions, such as handover decisions, are based on measurements of neighbour cells. Other tasks, such as radio resource management (RRM) tasks, cell search, and cell identification, also rely on neighbour cell measurements.

In referring to neighbour cells, in some cases, e.g., compliant with LTE Technical Specification Release 10 (Rel-10), a UE may receive aggregate neighbour cell information, i.e., information that is shared by all neighbour cells. For example, a UE receives an indication on whether all neighbour cells use the same MBSFN configuration as its serving cell. A UE may also receive a neighbour cell list comprising neighbour cell identifiers. Neighbour cell lists have been mandatory for mobility and RRM purposes in earlier networks, e.g., Universal Terrestrial Radio Access (UTRA) networks. However, such lists are optional in LTE. Regardless whether a UE is provided with a list of neighbour cell information, the UE needs to make the same measurements and meet the same requirements.

Besides neighbour cell lists, a UE may be provided other information about its neighbour cells. For example, a UE may experience interference from neighbour cells and may benefit from the knowledge about the interference characteristics of its neighbour cells. Examples of interference characteristics include when the interfering signal occurs and where in the frequency domain the interfering signal locates. Such interference characteristics may help a UE to perform Enhanced Inter-cell Interference Cancellation (eICIC). eICIC is a type of techniques used by a UE to reduce interference. In LTE Rel-10, to enable eICIC, a UE may receive measurement patterns via its serving cell or pico cell for performing measurements for the serving cell and its neighbour cells. For neighbour cells, often only one measurement pattern is provided per frequency for multiple cells. The one measurement pattern is provided along with a list of cell identities (e.g., physical cell identities (PC's)).

In recent development, e.g., in LTE Rel-11, a UE may be required to handle higher interference and may demand more network assistance for interference cancellation. For example, a UE may ask for (and be provided with) information such as the Cell-Specific Reference Signal (CRS) ports and the MBSFN configuration of at least some interfering neighbour cells.

In addition to inter-cell interference coordination techniques, measurement performance can also be improved by advanced receiver techniques, such as interference suppression or interference cancellation techniques. For example, receivers may be configured to implement Minimum Mean Square Error (MMSE)-Interference Rejection Combining (IRC) decoding/demodulation methods along with advanced covariance estimation techniques. Advanced receivers configured with Minimum Mean Square Error-Successive Interference Cancellation (MMSE-SIC) may be capable of performing non-linear subtractive-type interference cancellation to further enhance system performance.

The above described interference cancellation, interference coordination, and interference suppression techniques may benefit all types of network deployments, but are particularly useful in heterogeneous deployments. However, due to computational complexity and limited resources, these techniques may be used by the UE only for the purpose of mitigating interference on specific signals or channels. In one example, a UE applies an interference mitigation or cancellation technique on data channels only. In another example a more sophisticated UE applies interference mitigation on data channels as well as on one or two common control channels. Reference signals and synchronization signals are two examples of signals transmitted on a control channel.

Although interference cancellation, interference coordination, and interference suppression can be relied on to improve signal estimation by a UE in a high-interference environment, the techniques may involve additional computation complexities and require more processing power and/or more memory. Therefore these techniques cannot always be relied on by a UE when performing measurements.

Yet measurements are essential in some of the basic UE operations. For example, both cell search and cell identification require a UE to detect and measure reference signals and synchronization signals.

In cell search, a UE searches for signals with a specific signature known to the UE. To identify a new cell, the UE has to identify the cell and then, optionally or upon a request, obtain the globally unique Cell Global Identity (CGI). In LTE, cell identification includes detection of the cell and additionally performing a signal strength measurement (also known as verification), for example, a Reference Signal Received Power measurement performed on cell-specific reference signals (CRS).

Cell detection is performed based on synchronization signals, such as Primary Synchronization Signal (PSS) and Secondary Synchronization Signal (SSS). There are 504 unique physical-layer cell identities (PC's) in LTE. The physical-layer cell identities are grouped into 168 unique physical-layer cell-identity groups. Each physical-layer cell-identity group contains three unique identities and each physical-layer cell identity is part of one and only one group. A physical-layer cell identity can be expressed as $N_{ID}^{cell}=3N_{ID}^{(1)}+N_{ID}^{(2)}$ and is thus uniquely defined by a number $N_{ID}^{(1)}$ in the range of 0 to 167, representing the physical-layer cell-identity group, and a number $N_{ID}^{(2)}$ in the range of 0 to 2, representing the physical-layer identity within the physical-layer cell-identity group. The cell identity group is determined based on the known SSS sequences, and the identity within the group is determined based on the known PSS sequences. All unique combinations of PSS and SSS provide the 504 unique PC's, which may be reused in the same public land mobile network (PLMN) network on one frequency and/or across frequencies. PCI of a cell can then be used to determine the sequences of other signals (e.g., cell-specific reference signals, CRS, positioning reference signals, PRS, etc.) and their allocation in the time-frequency grid.

Figure 3:
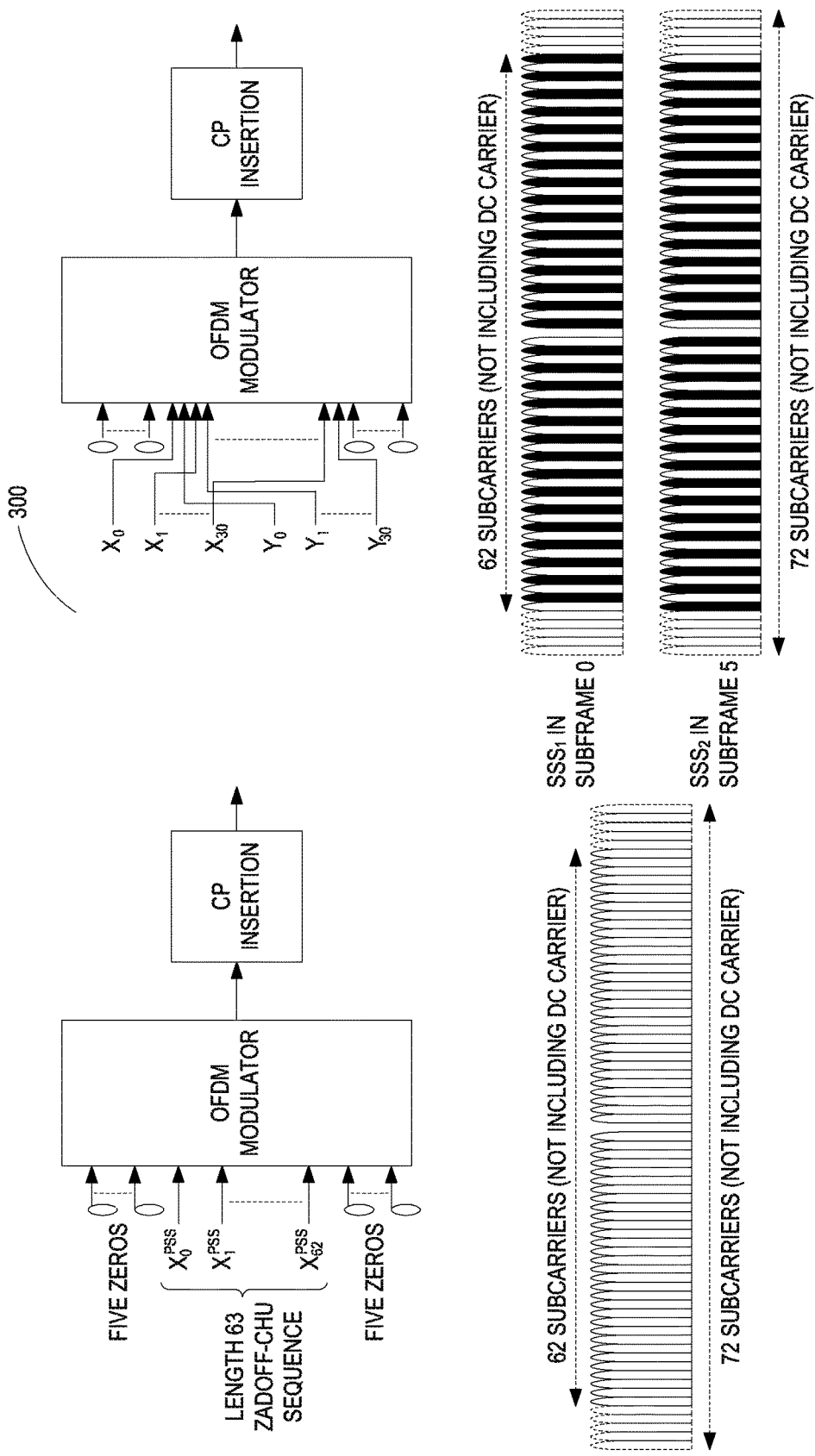
FIG. 3 illustrates an exemplary mapping of a Secondary Synchronization Signal (SSS) to OFDM subframes.
Figure 4B:
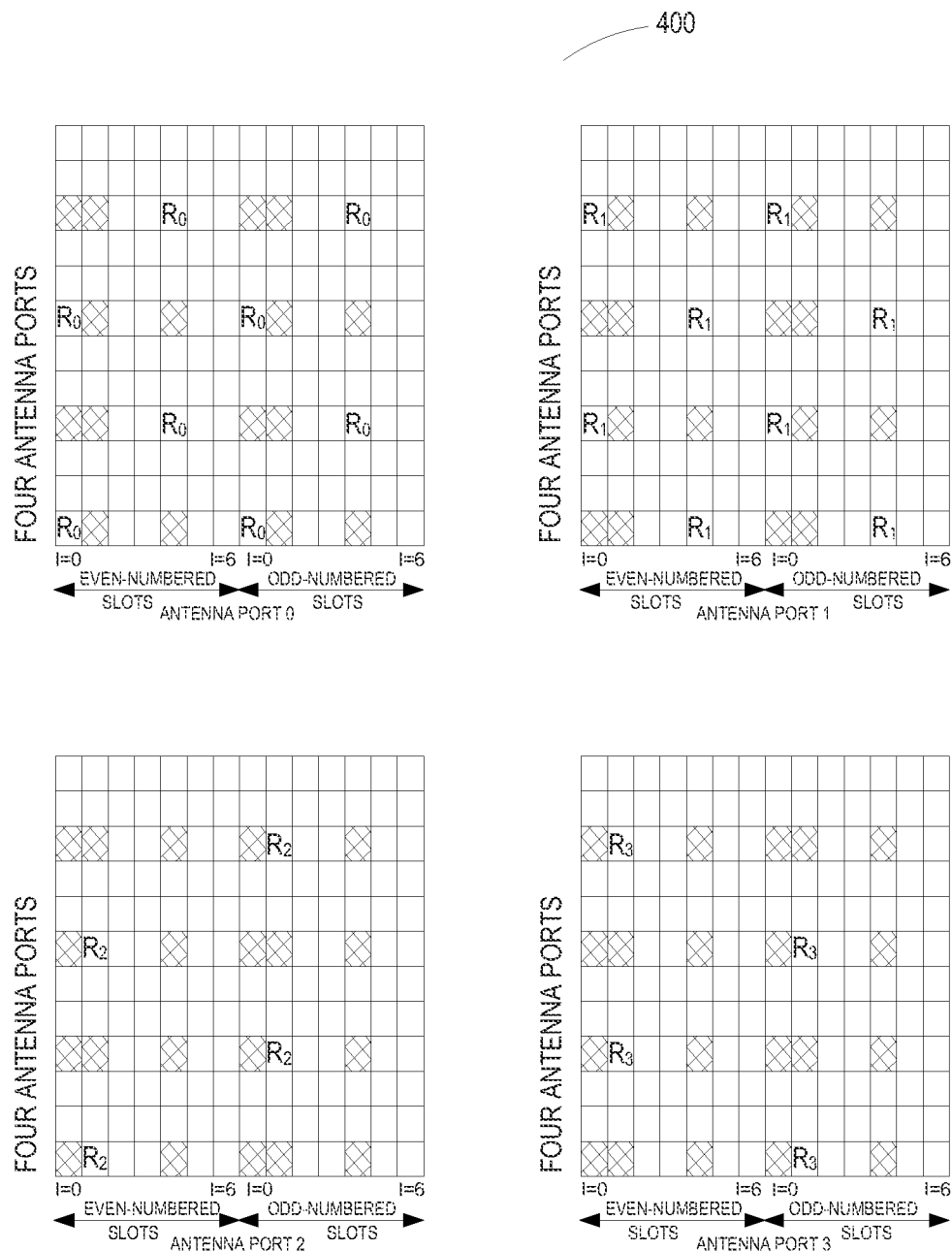

FIGS. 3, 4a, and 4b illustrate different allocation schemes for synchronization signals (PSS and SSS) and CRS signals (see e.g. 3GPP Technical Specification TS 36.211 Section 6.10.1.2).

FIG. 3 illustrates synchronization signals allocated in an OFDM resource element (300). In FIG. 3, the synchronization signals occupy 62 resource elements in the centre of the allocated bandwidth. In a synchronous network, the synchronization signals (PSS/SSS) from one cell overlap or interfere with the synchronization signals (PSS/SSS) from another cell, which correspond to reuse of 1% or 100% load all the time on these signals.

FIGS. 4a and 4b illustrates exemplary mappings 400 of cell-specific reference signals (CRS's) to a resource element. FIGS. 4a and 4b show different allocations of CRS signals in time-frequency grid for one antenna port, two antenna ports and four antenna ports. Different cells can use 6 different shifts in frequency. In practice there is a reuse-6 pattern for CRS transmitted from one transmit antenna ports and reuse-3 pattern for CRS transmitted from two transmit antenna ports. In a network where the load is low, the interference may be favourable for time measurements on CRS signals. In a network where the load is high, the interference situation becomes similar to what is experienced by PSS/SSS signals. In practice, however, networks seldom operate with downlink load higher than 70%, so the interference situation is typically better for CRS signals than for PSS/SSS signals. Interference conditions experienced by CRS signals may be further improved by configuring ABS (reduced-power or low activity subframes) in the interfering aggressor cells.

Generally, cell identification may be performed on the frequency of a Primary Cell (intra-frequency), or on a frequency of a Secondary Cell, which is also a serving cell with carrier aggregation (CA) (inter-frequency with carrier aggregation). Cell identification may also be performed on a frequency different than the serving cell frequencies (inter-frequency), or on a different Radio Access Technology (RAT) (e.g., inter-RAT). Inter-frequency and inter-RAT may also be inter-band when the frequencies belong to different frequency bands.

The current cell identification requirements specify a certain period time T during which the UE has to perform cell identification and report a corresponding event to the network. The required period T includes both the time necessary for detecting a cell and the time for performing a measurement (T1). The current standard specifies the length of the time periods for T and T1. Further, a UE is typically required to report N (e.g., N=8) identified cells within the required period. The requirements of cell identification include the measurement period length, number of cells, number of frequencies, etc. The requirements for cell identification are typically different for different situations, e.g., intra-frequency, inter-frequency and inter-RAT.

A non-carrier aggregation (non-CA) UE would normally require measurement gaps for performing inter-frequency or inter-RAT cell identification. The same applies for carrier aggregation-capable (CA-capable) UEs when performing cell identification on a non-configured or deactivated carrier. CA-capable UE, however, normally would not require measurement gaps for measurements on SCC.

Cell identification may also be performed during specifically configured low-interference time periods, e.g., indicated by a time-domain measurement resource restriction pattern which the network may signal to the UE to facilitate enhanced Inter-Cell Interference Coordination (eICIC) in heterogeneous deployments. It is, however, noted that such measurement patterns do not help to improve interference situation on PSS/SSS in a synchronous network or frame-aligned network where PSS/SSS always experience 100% load since these signals are always transmitted in all cells. The patterns may, however, be useful for improving RSRP accuracy or RSRQ level associated with CRS signals, which may be allocated differently in different subframes. The network may signal to the measuring UE the subframes with the preferred interference conditions in restricted measurement patterns.

As demonstrated by the above described examples, performing and reporting measurements by a UE is one of the basic functionalities required of a UE, but it is also challenging, especially in high-interference conditions. This is because in a high interference condition, the interference may be too high and the victim signal may be too week. For example, in LTE 3GPP Technical Specification TS Rel-11, the cell range expansion (CRE) bias may be up to 9 dB but Es/Iot may be lower than −9 dB depending on the absolute values of Es/Noc of the victim and aggressor signals. In a high interference condition, a UE or a wireless device may need to estimate the interfering channel for interference cancellation. Estimating an interfering channel would require additional UE resources and time.

As described above, ABS subframes may be configured to facilitate a UE to perform measurements. But in a high interference condition, there may exist an aggressor transmitting interfering signals other than the desired cell-specific reference signals during ABS subframes. Examples of interfering signals that may exist during ABS subframes include S1 transmissions (transmissions between a radio network node and an Evolved Packet Core), paging, or even data transmissions in the special case of reduced power ABS. This aggressor may be unknown to the network or the information regarding the aggressor cell may be unavailable. For example, the information regarding the aggressor cell may include the time-frequency resources randomly assigned to neighbour PDSCH or control channels. Without such information about an aggressor, interference cancellation may be difficult to accomplish by a UE during signal measurements or estimation.

New signal estimation techniques are desirable for UEs located in a wireless communication system, especially in a heterogeneous network.

FIG. 5 illustrates a network deployment 500 that comprises a first radio network node 602, a second radio network node 604, and a wireless device 606. In some embodiments, the two radio network nodes, 602 and 604, are co-located. In other embodiments, the two radio network nodes, 602 and 604, simply represent two different transmit antennas (e.g., in two different cells) of the same base station.

Regardless, signals of different types from both radio network nodes 602, 604 are received at the wireless device 606. In the embodiment shown in FIG. 5, the wireless device 606 receives a first signal of a first type and a first signal of a second type from the first radio network node 602. The wireless device 606 also receives a second signal of the first type and a second signal of the second type from the second radio network node 604. In some embodiments, signals of the first type are synchronization signals (e.g., PSS or SSS), while signals of the second type are reference signals (e.g., CRS, PRS, DM-RS, MBSFN RS). However, the converse is true in other embodiments. Broadly, therefore, the first type is simply different from the second type.

In FIG. 5, the first signals and the second signals are depicted as actual signals respectively transmitted by the first and second radio network nodes 602, 604. In some embodiments, though, one or more of these signals are not actually transmitted by the radio network nodes 602, 604. In one or more such embodiments where a particular signal is not actually transmitted by a particular radio network node, the wireless device 606 as described in more detail below still obtains a signal estimate for that signal as if it were transmitted by the radio network node. The signal estimate for this signal is referred to herein as a virtual signal estimate, and the signal though not actually transmitted by the radio network node is nonetheless considered by the device 606 to be associated with that radio network node. Thus, regardless of whether all signals in FIG. 5 are actually transmitted, the first signals are associated with the first radio network node 602 and the second signals are associated with the second radio network node 604.

Figure 6A:
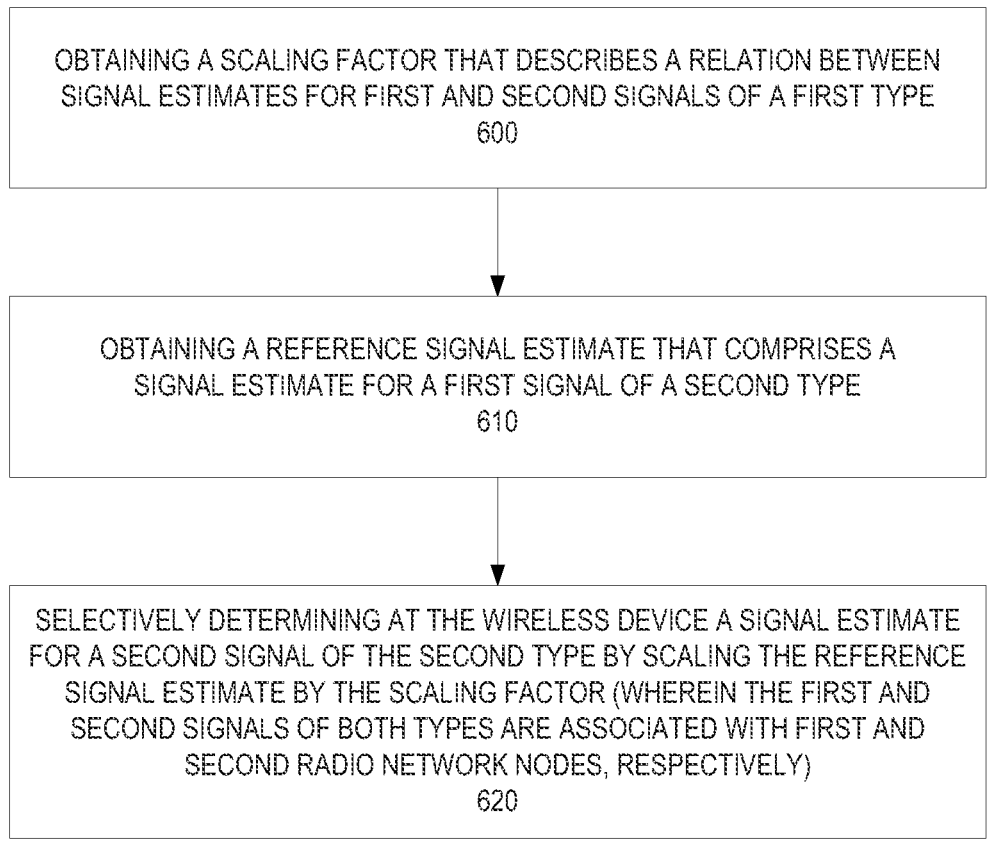
FIGS. 6a-6b is a flow-chart illustrating an exemplary signal estimation process.

With this understanding, FIG. 6a illustrates a signal estimation process that the wireless device 606 implements in one or more embodiments for determining a signal estimate for the second signal of the second type.

In FIG. 6a, the wireless device 606 obtains a scaling factor that describes a relation between signal estimates for the first and second signals of the first type (step 600). For example, the scaling factor in some embodiments is a ratio of the signal estimate for the second signal of the first type to the signal estimate for the first signal of the first type. Regardless, the wireless device 606 further obtains a reference signal estimate that comprises a signal estimate for the first signal of the second type (step 610). The wireless device 606 then selectively determines a signal estimate for the second signal of the second type by scaling the reference signal estimate by the scaling factor (step 620). The approach of determining the signal estimate for the second signal of the second type by such scaling is broadly considered herein as the "scaling approach".

Note that a signal estimate for a signal as used herein generically refers for instance to a channel estimate for the signal (e.g., path gain or path loss), a power estimate for the signal (e.g., Reference Signal Received power, RSRP), a quality estimate for the signal (e.g., Reference Signal Received Quality, RSRQ), or the like. For instance, in embodiments where a signal estimate comprises a channel estimate or received signal power estimate, the scaling approach may be mathematically described in a linear scale as:

$$p = \gamma_p \cdot \tilde{p}$$

or $$c = \gamma_c \cdot \tilde{c},$$

where c and p are respectively the to-be-determined channel estimate and received signal power estimate for the second signal of the second type; $\tilde{c}$ and $\tilde{p}$ are the corresponding reference signal estimates comprising signal estimates for the first signal of the second type; and $$\gamma_c = \frac{c_2}{c_1} \text{ and } \gamma_p = \frac{p_2}{p_1}$$

are the corresponding scaling factors. Here sub-index 1 corresponds to the first signal of the first type and sub-index 2 corresponds to the second signal of the first type. The two scaling factors are related to each other, e.g., $$\gamma_p = \alpha \cdot \gamma_c,$$

where α reflects the ratio between the transmit power levels, bandwidth, etc., of the channel estimate and those of the received signal power estimate. The scaling factors and the mathematical relations above are in some alternative embodiments defined in a logarithmic scale.

Regardless of the particular type of signal estimates used, the wireless device 606 obtains the scaling factor in some embodiments by receiving the scaling factor from another node. This other node may be for instance a radio network node, a positioning node, etc. The wireless device 606 may also receive from another node information regarding an adjustment to the scaling factor or information that assists the wireless device to determine whether to apply the scaling factor or the adjustment to the scaling factor for determining the signal estimate for the second signal of the second type. Of course, the wireless device 606 may need to transmit to a network node its capability information indicating whether the wireless device is capable of determining the signal estimate for the second signal of the second type by scaling.

In other embodiments, by contrast, the wireless device 606 obtains the scaling factor by computing that scaling factor. Specifically, the device 606 receives the first and second signals of the first type, computes the signal estimates for those signals, and calculates the scaling factor based on those computed signal estimates. For instance, the device 606 calculates the scaling factor as a ratio of the computed signal estimate for the second signal of the first type to the computed signal estimate for the first signal of the first type.

A scaling factor so obtained, however, in some embodiments is adjusted through application of a correction factor that describes a relation between the first and second types of signals at the first and second radio network nodes 602, 604. Such a correction factor may be applied to the scaling factor to account for the differences between the first and second radio network nodes or the differences between the signals of the first and second types in time, frequency, and otherwise.

In some embodiments, for example, the device 606 computes the correction factor based on a difference between (i) a first power ratio of the first signal of the first type and the first signal of the second type and (ii) a second power ratio of the second signal of the first type and the second signal of the second type. Alternatively, the device 606 computes the correction factor based on bandwidth information, power classes, and/or the number of transmit antennas associated with the first and second radio network nodes.

Regardless, where the device 606 adjusts the scaling factor by the correction factor, the device 606 determines a received signal power estimate or a channel estimate for the second signal of the second type as:

$$p = \beta_p \cdot \gamma_p \cdot \tilde{p}$$

or $$c = \beta_c \cdot \gamma_c \cdot \tilde{c},$$

where correction factors $\beta_p$ and $\beta_c$ additionally account for differences between signals of the first type and the second type, e.g., power difference, bandwidth difference, number of transmit antenna ports. The differences may also be time and/or frequency resource specific. For example, some signals are transmitted at a lower power at certain time instances and at a higher power at other time instances.

Irrespective of these alternatives, the scaling approach proves particularly advantageous, for example, in embodiments where the first radio network node 602 is a high-power node and the second radio network node 604 is a low-power radio network node. The first signals received from the high-power node 602 are stronger than the second signals received from the low-power node 604 and therefore interfere with those second signals. The interference from the high-power node 602 may threaten the ability of the wireless device 606 to perform conventional measurements on the second signals the wireless device 606 receives from the low-power node 604. In embodiments where the second type of signal is a reference signal, for instance, this would threaten the ability of the wireless device 606 to obtain a signal estimate for the reference signal received from the low-power node 604 and would therefore threaten performance.

In general, a wireless device in high interference conditions would typically be provided with a measurement pattern indicating subframes with reduced interference from aggressor cell(s). For example, in the current standard, one out of 10 subframes within a radio frame may be such a reduced-interference subframe. A higher density of reduced-interference subframes may not be desirable from the overall system capacity point of view because the aggressor cell generally does not transmit in the reduced-interference subframes. An aggressor cell would often be a macro cell, which usually has a large coverage area. Therefore an increase in the density of reduced-interference subframes will result in a loss of system capacity. Such loss may not compensated by the expanded coverage of pico cells. As a result, reduced-interference subframes are generally sparse in time, which means wireless devices in high-interference conditions that are restricted to perform measurements in these low-interference subframes do not get many opportunities to perform the required measurements. On the other hand, performing measurements in subframes other than the reduced-interference subframes would normally resulted in either degraded measurement performance (e.g., accuracy) or failure to meet the specified measurement requirements.

With the scaling approach, the wireless device is not bound to perform measurements on a signal known to be weak only in sparse restricted subframes. This is because the wireless device only needs to measure the aggressor RSRP which is strong in most subframes. The wireless device does not need to measure RSRP of the pico cell. The wireless device can calculate it based on the scaling factor and the reference estimate (aggressor RSRP). Hence the weak pico RSRP may be estimated faster and more accurately (the accuracy is likely to be as accurate as that of the aggressor RSRP).

Therefore, for high-interference scenarios, at least some embodiments herein advantageously estimate a weak signal by scaling an estimate of a strong signal of the same type by a scaling factor. Without relying on a conventional approach that derives a signal estimate for the low-power node's reference signal directly from the received signal, the wireless device 606 herein advantageously determines that signal estimate using the scaling approach. In one specific example, the device 606 does so by exploiting synchronization signals associated with the radio network nodes 602, 604 as the first type of signals. That is, the wireless device 606 obtains a scaling factor that describes a relation between a signal estimate for a synchronization signal associated with the low-power node 604 and a signal estimate for a synchronization signal associated with the high-power node 602. The device 606 also obtains a reference signal estimate that comprises a signal estimate for a reference signal associated with the high-power node 602. The device 606 then scales this reference signal estimate by the scaling factor in order to determine the signal estimate for the reference signal associated with the low-power node 604.

Consider details of a particular example where the weak signal is a CRS of a pico cell for a UE in the cell range expansion (CRE) zone, and the strong signal is a CRS of a macro cell. The scaling factor reflects a ratio between a channel or power estimate for the two signal sources. For example, $$p_{weak} = \gamma p_{strong},$$

where $p_{weak}$ is the calculated power estimate of the weak signal, $p_{strong}$ is the power estimate (e.g., RSRP) of the known strong signal as the reference signal estimate, and $\gamma$ is the scaling factor. In some embodiment, the scaling factor, $\gamma$, is calculated using Secondary Synchronization Signals (SSS). SSS are periodically transmitted, easy to measure for a known cell, and robust for cell planning, as compared to other synchronization signals such as Primary Synchronization Signals (PSS). Using the scaling factor, $\gamma$, the signal estimate of a received signal power of a reference signal (e.g., CRS) in a pico cell is expressed as:

$$p_{pico,CRS} = \gamma \cdot p_{macro,CRS} = \frac{p_{pico,SSS}}{p_{macro,SSS}} \cdot p_{macro,CRS}.$$

Because the estimate of a pico CRS signal is dependent on the estimate of a macro CRS signal, the accuracy of the obtained estimate for a weak signal (pico CRS) can be as accurate as the estimate for the strong aggressor signal. This represents a significant performance gain, when compared to the method of using a direct estimation of the weak signal. For simplicity, in the above equation, the power difference between SSS and CRS in the same cell is assumed to be the same. In a more general case, the difference can be obtained by the UE, for example, being received as a part of eICIC assistance information. The difference between SSS and CRS in some embodiments is corrected by a correction factor as discussed above.

The scaling factor in the above described scenarios is calculated using signal estimates of same type signals, which is advantageous when compared to the prior art described in the background section. The prior art approach assumes that the ratio of the received pilot power to the synchronization channel power is the same for different cells, an assumption that does not generally hold true.

Of course, although the scaling approach proves advantageous in this and other scenarios, the scaling approach may not be as advantageous under certain conditions. Accordingly, in step 620 of FIG. 6a, the wireless device 606 in some embodiments decides whether to apply the scaling approach by evaluating one or more conditions or parameters indicating whether the scaling approach would prove advantageous or whether the scaling approach is needed.

If the scaling approach is not advantageous or not needed, the device 606 may resort to applying a conventional approach for estimating the second signal of the second type.

Figure 6B:
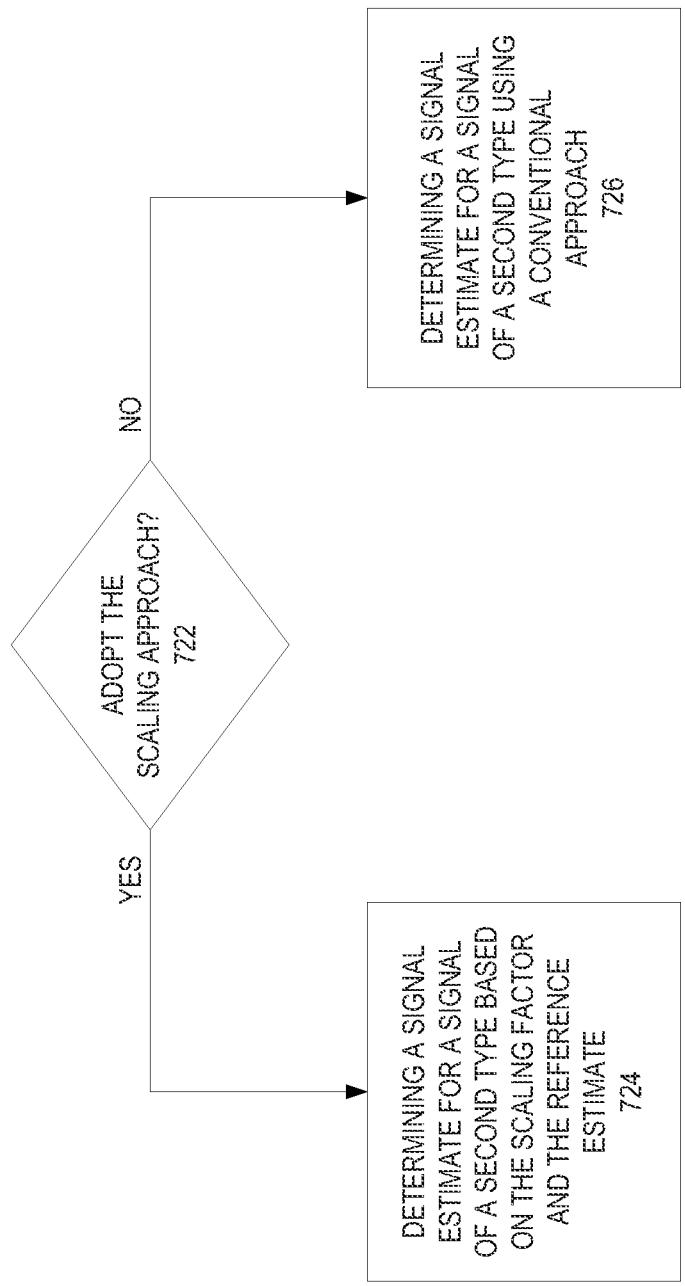

As shown in FIG. 6b, the wireless device 606 in this case adaptively determines whether to adopt the scaling approach in step 722. If the answer is yes, the wireless device 606 will determine a signal estimate for the second signal of the second type using the scaling approach (step 724). If the answer is no, the wireless device 606 will determine a signal estimate for the second signal of the second type using a conventional approach (step 726).

In some embodiments, the wireless device 606 determines to apply the scaling approach in response to determining that the first radio network node 602 is functioning as an aggressor with respect to the second radio network node 604; that is, in response to detecting a victim-aggressor scenario. Indeed, as demonstrated above, the scaling approach is often the more resource-efficient approach in a victim-aggressor scenario, which otherwise would require an advanced receiver under the conventional approach.

Different methods are available for the wireless device 606 to detect whether the wireless device 606 is operating in a victim-aggressor scenario. For example, the wireless device 606 may receive an indication from another radio network node identifying the aggressor radio network node. In some embodiments, the indication may be a piece of assistance data received from a serving eNodeB for handling interference and/or it may be a measurement resource restriction pattern indicating a subset of subframes with improved interference conditions. The wireless device 606 may also determine that it is operating in a victim-aggressor scenario during a mobility event, e.g., a handover to a CRE zone. The wireless device 606 may detect that the signal strength or quality of the first signal of the second type is deteriorating and decide the deterioration is due to an aggressor. The wireless device 606 may detect a victim-aggressor scenario by relying on network assistance or autonomously by blind detection. The wireless device 606 may also detect a victim-aggressor scenario based on historical data stored on the device or based on the total interference measurements or interference measurements on specific time-frequency resources such as specific resource elements.

The wireless device 606 in other embodiments determines, additionally or alternatively, to apply the scaling approach in response to determining that the second signal of the second type has a density in time, frequency, or both that is lower than a defined threshold. The density of a signal in LTE embodiments, for example, refers to the mapping pattern of the signal to OFDM resource elements or LTE subframes. See FIGS. 3, 4a, and 4b. For example, in FIGS. 4a and 4b, the density of a reference signal reflects how many resource elements in an OFDM resource block are allocated for reference symbols. When the density of the second signal of the second type is too low to enable accurate measurements, even if the first end of the second signals of the second type overlaps, which presumably can boost channel estimation, the channel estimation may still be low if the scaling approach is not used. Similarly, in another embodiment, additionally or alternatively, the wireless device 606 decides to adopt the scaling approach based on the overlap of the signal to be estimated, e.g., the second signal of the second type.

In still other embodiments, the wireless device 606 decides, additionally or alternatively, to apply the scaling approach in response to the wireless device 606 being in a low power or low activity state. For example, the scaling approach in these embodiments is applied when the device's resources such as the battery level or memory level are at a critical level. As another example, the scaling approach is additionally or alternatively applied when the wireless device 606 is in a low-activity state, such as IDLE, Discontinuous Reception (DRX) states.

In yet other embodiments, the wireless device 606 decides, additionally or alternatively, to apply the scaling approach in response to determining that the first signal of the second type is not available for measurement at the wireless device 606. Indeed, in this case, the device 606 would be unable to apply a conventional approach. Such is the case for instance when the first signal of the second type is a CRS that is not transmitted by the first radio network node 602, e.g., with a new (non-legacy) carrier type. Regardless, the device 606 applies the scaling approach under these circumstances by obtaining the reference signal estimate in a particular way. Namely, the device obtains the reference signal estimate by obtaining the signal estimate for the first signal of the second type as a virtual signal estimate that is generally associated with a signal of the second type. In other words, the virtual signal estimate is a radio measurement generally associated with a signal of the second type. For example, RSRP measurements are generally performed on CRS signals, which, however, may not always be transmitted by a radio network node when the radio network node is configured with a new carrier type. However, RSRP measurements could still be reported even for a carrier where CRS is not transmitted, and such RSRP measurement can be used as the reference estimate.

In general, therefore, the wireless device 606 in these embodiments adopts the scaling approach when measuring a signal of the second type is more challenging or impossible under certain special configuration or conditions.

In one or more other embodiments, the wireless device 606 decides whether to adopt the scaling approach by assessing the availability of signal information, for example, known parameters used for signal sequence generation such as Pre-Coding Control Indication (PCI), time alignment, time and frequency resource used for signal transmission, etc. The wireless device 606 may determine whether it is feasible to cancel interference from an interfering node as often required by a conventional approach. For example, when a Physical Downlink Shared Channel (PDSCH) or a control channel is interfering with a reference signal, (e.g., the first signal of the second type), it is generally not possible to cancel the interference from the PDSCH or control channel. In such case, the scaling approach is particularly beneficial if the first signal and the second signal of the first type are known.

In some embodiments, the wireless device 606 decides to adopt the scaling approach if a scaling factor is already available or is easy to obtain based on measurements that are already available.

Broadly, therefore, adopting the scaling approach is especially beneficial and provides additional advantages such as more efficient receiver operation when one or more of the following conditions are met. For example, it may be beneficial to adopt the scaling approach when more than one weak signals need to be estimated (e.g., CRS, DM-RS, and PRS). Or when more than one aggressor cells are present (compared to interference cancellation when all of them would have to be estimated and subtracted). Or when the aggressor and victim cells use different CPs in ABS, in which case the scaling approach avoids direct estimation, thus avoiding the need for measuring the victim signal in the ABS subframe. Or when the weak signals are transmitted with a low density in a time-frequency resource element grid. Or when joint channel estimation based on the overlapping SSS for the aggressor and victim cells can be used for estimating the scaling factor (described in more detail below), as joint channel estimation boosts performance. Or when the weak signal and the strong known signal are not colliding (e.g., macro and pico CRS are shifted in frequency). Or when the network is SFN-aligned, which is generally problematic from the interference point of view, e.g., for synchronization signals, but the scaling approach and joint channel estimation may actually benefit from the SFN alignment.

In the above sections, various embodiments are described for determining whether or when a UE should adopt a convention approach or a scaling approach in signal estimation. In the following sections, the scaling approach is explained in more detail.

Obtaining the Scaling Factor

In some embodiments, the scaling factor is obtained by using any channel estimation or signal power estimation approach or even timing measurements (e.g., power-based or timing measurements or timing difference measurements). Obtaining the scaling factor in general is not limited to a specific relation of time- and/or frequency resources when the signals of the first type are transmitted, e.g. the resources may or may not overlap. However, for some specific algorithms, the overlap may be beneficial, e.g., to allow joint channel estimation to be applied, as described below.

In this case, the device 606 computes the scaling factor using a joint channel estimation approach whereby the device 606 simultaneously determines the channel estimates for the first and second signals of the first type. It is generally possible to perform joint channel estimation on these two signals when the two signals are transmitted in the same time instances. Accordingly, in some embodiments, the device 606 determines if the first and second signals of the first type are substantially time-aligned, and, if so, selects a joint channel estimation approach from among multiple possible channel estimation approaches for estimating the channels associated with those signals. Performing joint channel estimation in this way is typically a better approach than the usual method of estimating a stronger channel and then subtracting (i.e. cancelling the interference) the stronger channel to estimate a weaker channel. Joint channel estimation can be used to boost performance, even compared to interference cancellation.

In more detail, a joint channel estimator provides two estimates, $\hat{h}_1$ and $\hat{h}_2$, of the two corresponding channels $h_i=[h_{01}, h_{11}, \ldots, h_{L1}]^T$, where i=1, 2, L is the channel memory length. The complex channel impulse response for the two channels (2×(L+1) matrix) is:

$$h = \begin{bmatrix} h_1 \\ h_2 \end{bmatrix}$$

and the received signal can be expressed as:

$$y=[S_1 S_2] \cdot h+e,$$

where $S=[S_1 \ S_2]$ joins two matrices describing the two transmitted signal sequences, and e is the noise.

The channel estimates may be found, e.g., using the least squares approach by minimising the squared error quantity, which yields, in the presence of AWGN, the following solution of the channel estimates:

$$\hat{h} = \begin{bmatrix} \hat{h}_1 \\ \hat{h}_2 \end{bmatrix} = \underset{h}{\operatorname{argmin}} \|y - S \cdot h\|^2 = (S^H S)^{-1} S^H y.$$

In some embodiments, the scaling factor $\gamma_c$ is derived using the channel estimates that have been jointly determined. The scaling factor $\gamma_c$ can be expressed as $$\gamma_c = \frac{\|\hat{h}_2\|^2}{\|\hat{h}_1\|^2},$$

where $\|\cdot\|$ is the squared (quadratic) norm.
For additional details, see PCT Patent Application WO/2009/059986, which is incorporated by reference herein.

The decision of whether to use a joint channel estimation process to obtain a scaling factor is based on one or more of the following considerations. One consideration is the availability of certain signal information. For example, when a weaker signal is not known, interference cancellation may be needed, which would render joint estimation not possible.

Another consideration is the level of synchronization or misalignment between the first radio network node and the second radio network node. In some embodiments, if tight alignment is advantageous, joint channel estimation may be used. In some embodiments, a more advanced joint channel estimation scheme may be needed when different cyclic prefixes are used. See WO/2009/059986 for details.

In some embodiments, yet another consideration is the level of overlap of the time- and/or frequency resources used for transmissions of the first and second radio signals of the first type. In certain scenarios, full or sufficient level of overlap at least in time is needed to enable reliable joint signal estimation. An example of overlap in time is the case when the two signals are received in the same symbol.

In some embodiments, the level of overlap of the time- and/or frequency resources used for transmissions of the first and second radio signals of the second type is also considered. However, it is noted that overlap in time and/or frequency may or may not occur and when there is no overlap, there are additional advantages for using the scaling approach. Of course, other consideration may also be possible.

Joint channel estimation is particularly beneficial when the first and second signals of the second type do not overlap. Joint channel estimation is also beneficial in cases when the second signal of the second type is transmitted with low density in time and/or frequency resource grid and therefore cannot be used for high-accuracy measurements.

Regarding the time(s) at which the device 606 obtains the scaling factor, the device 606 may be configured to generate the scaling factor periodically or at pre-determined time instances. The wireless device 606 may also be configured to obtain a scaling factor upon a triggering event or a condition. The wireless device 606 may also be configured to obtain a scaling factor upon an explicit or implicit indication/request from another node.

In one example, the estimation of the scaling factor is triggered or initiated close in time to the time instances when either the reference estimate becomes available, e.g., when RSRP of the aggressor is performed, or the target estimate (e.g., the second signal of the second type) is expected to be obtained. In one example, when the scaling factor is estimated based on SSS and the target estimate is for CRS, the UE needs to receive SSS more often to follow RSRP measurements, e.g., every 40-60 ms. Measurements of SSS for cell detection purpose generally require a different periodicity, which may also be different (longer) than the SSS transmission periodicity. In some embodiments, specific rules or minimum requirements may be pre-defined. The requirements include the accuracy of SSS estimations and measurement period for performing SSS estimation, e.g., of a detected cell or the cell for which at least the timing and/or PCI are known. Such pre-defined rules are used to obtain estimates, for example, channel or received signal power estimates, for the purpose of calculating the scaling factor.

In one example, the scaling factor is derived by sequentially calculating two estimates used for obtaining the scaling factor. In another example, interference cancellation is used to obtain at least one of the two estimates used for obtaining the scaling factor. In yet another example, the scaling factor may be received by the wireless device in the assistance data sent by another node, e.g., from eNodeB, or derived based on the data received from another node.

Obtaining a Correction Factor

In one example, a correction factor is obtained based on the data received via higher-layer signaling from another node. The correction factor can be explicitly signaled or provided implicitly in the form of data or indicators which are used to derive the correction factor. Examples of such data include bandwidth information, base station power classes, deviation from a nominal power level, number of transmit antennas. In another example, a correction factors is obtained by the wireless device 606 based on the information received via lower-layer signaling, e.g., by reading a physical broadcast channel or a physical control channel. In yet another example, a correction factor is derived based on the wireless device's other measurements and/or location information. In yet another example, a correction factor is associated with specific time and/or frequency resources. These resource may be indicated by a pattern, such as a transmit pattern or measurement pattern. Of course, any combination of the above may apply.

Obtaining the Reference Signal Estimate

As illustrated in FIG. 6a, in the scaling approach, a scaling factor is applied to a reference estimate to obtain a signal estimate of a desired signal. In general, for a reference estimate, it is desirable to use a type of signal that is allocated in time/frequency resource grid with sufficient density and that possesses known characteristics (signal sequence, for example), sufficient transmit power, and received signal strength. The signal type used for a reference estimate may be pre-defined or decided by the wireless device 606. A network node can also suggest or advise a signal type to the wireless device 606 for use as a reference estimate, e.g., by sending an indication of the signal type to the wireless device 606.

In general, therefore, different options exist in some embodiments for which particular type of signal will be used for the reference signal estimate (and thereby referred to as the "second type" of signal) and which particular type of signal will be used for the scaling factor (and thereby referred to as the "first type"). Broadly, it may be preferred to use a particular type of signal (e.g., a reference signal) for the reference signal estimate if (A) signals of that type are known; (B) estimates for a type of signal being considered for use in obtaining the scaling factor are not sufficiently accurate (e.g., below a requirement or a target threshold); (C) signals of that type have a large bandwidth and/or it is possible to obtain more samples of signals of that type; (D) the estimate of signals of that type are more accurate than signals of the type on which the scaling factor is based; and/or (E) signals of that type are transmitted on less interfered time/frequency resources.

On the other hand, it may be preferred in some embodiments to use a different type of signal (e.g., a synchronization signal) for the reference signal estimate if either of the originally selected types for the scaling and reference signal estimates is not optimal. This includes (A) the type of signal being considered for obtaining the scaling has a density in time and/or frequency domain that is not sufficient for an accurate estimate, which (B) there are no signals of another candidate type of signal being considered for obtaining the reference signal estimate (e.g., no CRS are transmitted); (C) there is a time gap between the measurement occasions of that type of signal and the type of signal being considered for obtaining the scaling factor, such that the channel estimate on the first type signal and the reference estimate on the second type signal may not be accurate or reliable, especially when the channels vary fast (e.g., Doppler frequency is above a threshold) or the wireless device is moving fast (e.g., speed is above a threshold); and/or (D) when the power relation between that type of signal and the type of signal being considered for obtaining the scaling factor is not known or dynamically changing.

Other Embodiments

As noted above, in some embodiments, the signals of the first type (i.e., those on which the scaling factor is based) include synchronization signals (e.g., PSS or SSS) and the signals of the second type (i.e., those on which the reference signal estimate is based) include reference signals (e.g., CRS, PRS, DM-RS, MBSFN RS or other signals that are not a synchronization signal). Although the disclosure is not limited to such embodiments, synchronization signals such as PSS or SSS are often transmitted at a more regular basis than other types of signals, e.g., reference signals. Therefore, in some cases, the UE may have estimated the synchronization signals already before performing measurements on a reference signal. In other cases, the synchronization signals can be estimated with relatively small efforts. Hence, it would be advantageous to reuse the already-known signal estimates or easy-to-obtain signal estimates to derive an estimate of a weak victim signal.

In a more general embodiment, the scaling approach can be applied to estimate more than one signal of the second type. The scaling approach may be also applied to signals of a third type. The same or different scaling factors may apply for different signal pairs, which will depend on factors such as configurations of the two signals in the pair, the distances between transmitters and receiver, etc. In one example, joint channel estimation is also applied to more than one type of signals.

In some embodiments, the wireless device 606 performs cell grouping and adapt its approaches to signal estimation accordingly. For example, cells can be grouped into two cell groups, cells for which the scaling approach is used (e.g., weak cells) and cells for which scaling approach is not used (e.g., other cells). Further within the cell group comprising cells for which the scaling approach is used, two sub-groups may be formed: cells for which the scaling approach is based on joint channel estimation (e.g., time-aligned cells) and cells for which the scaling approach is based on some other channel estimation approaches (e.g., non-time aligned cells). Cell grouping can impact which cells are measured in parallel during at least some time periods.

In the following sections, two exemplary embodiments are described below to illustrate the principles and techniques described above.

Figure 7:
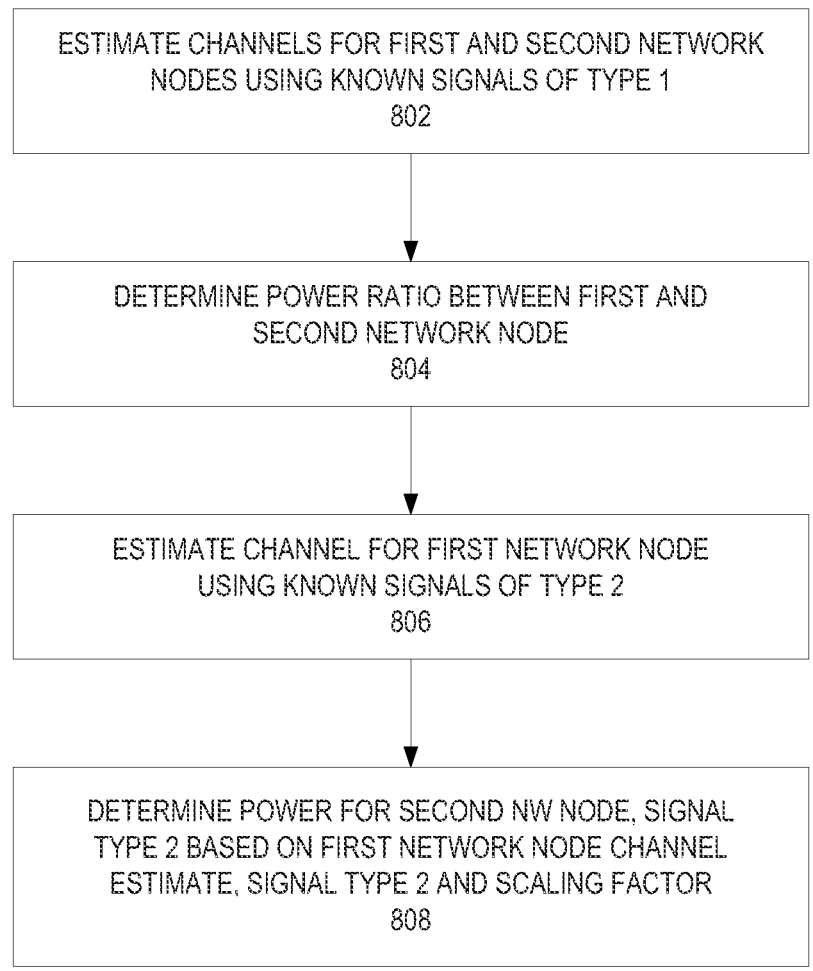
FIG. 7 is a flow-chart illustrating an exemplary channel estimation process.

FIG. 7 illustrates a flow chart of an LTE embodiment. In this embodiment, two radio network nodes, 602 and 604 (see FIG. 5), are assumed to be (almost) time-aligned, i.e. the synchronization signals overlaps (within the cyclic prefix) in time. The radio network nodes, 602 and 604, may be a macro and a pico cell, respectively. The relative power between the synchronization signals, e.g., SSS signals, and the reference signals, e.g., the CRS signals, is assumed to be constant and the same for both cells. Furthermore, the cell identifiers (IDs) for the corresponding cells are such that the CRS of these two cells do not overlap. Therefore, if a wireless device in the cell range extension (CRE) zone tries to estimate the RSRP for the pico cell in non-blank subframes, the interference level may be high and the RSRP estimate may be inaccurate. However, the RSRP for the macro cell, having high SNR, can be accurately estimated.

In FIG. 7, the transceiver in the wireless device (jointly) estimates the radio channels associated with the link between the wireless device 606 and the first radio network node 602 and the link between the wireless device 606 and second radio network nodes, 602 and 604, using known (pilots) signals of a first type (step 802). In one example LTE embodiment, signals of the first type are Secondary Synchronization Signals (SSS). In one example, the first radio network node 602 may be a macro cell and the second radio network node 604 may be a pico cell, so the power ratio between the SSS for the first and second network node, 602 and 604, can be estimated as:

$$\gamma_p = \frac{p_{pico,SSS}}{p_{macro,SSS}},$$

as shown in step 804. The wireless device then estimates the channel for the first network node (e.g. macro cell) using a first (known) signal of the second type (e.g. CRSs) (step 806). The wireless device 606 also estimates RSRP (measured on CRS) for the first network node to obtain a reference estimate, $\tilde{p}_{macro,CRS}$, using the estimated channel for the first network node. Then the (virtual) RSRP for the pico cell, $p_{pico,CRS}$, is determined based on the power ratio and the RSRP estimate for the macro cell 602, e.g., as $$p_{pico,CRS} = \gamma_p \cdot \tilde{p}_{macro,CRS} = \frac{p_{pico,SSS}}{p_{macro,SSS}} \cdot \tilde{p}_{macro,CRS}.$$

See step 808 in FIG. 7.

Figure 8:
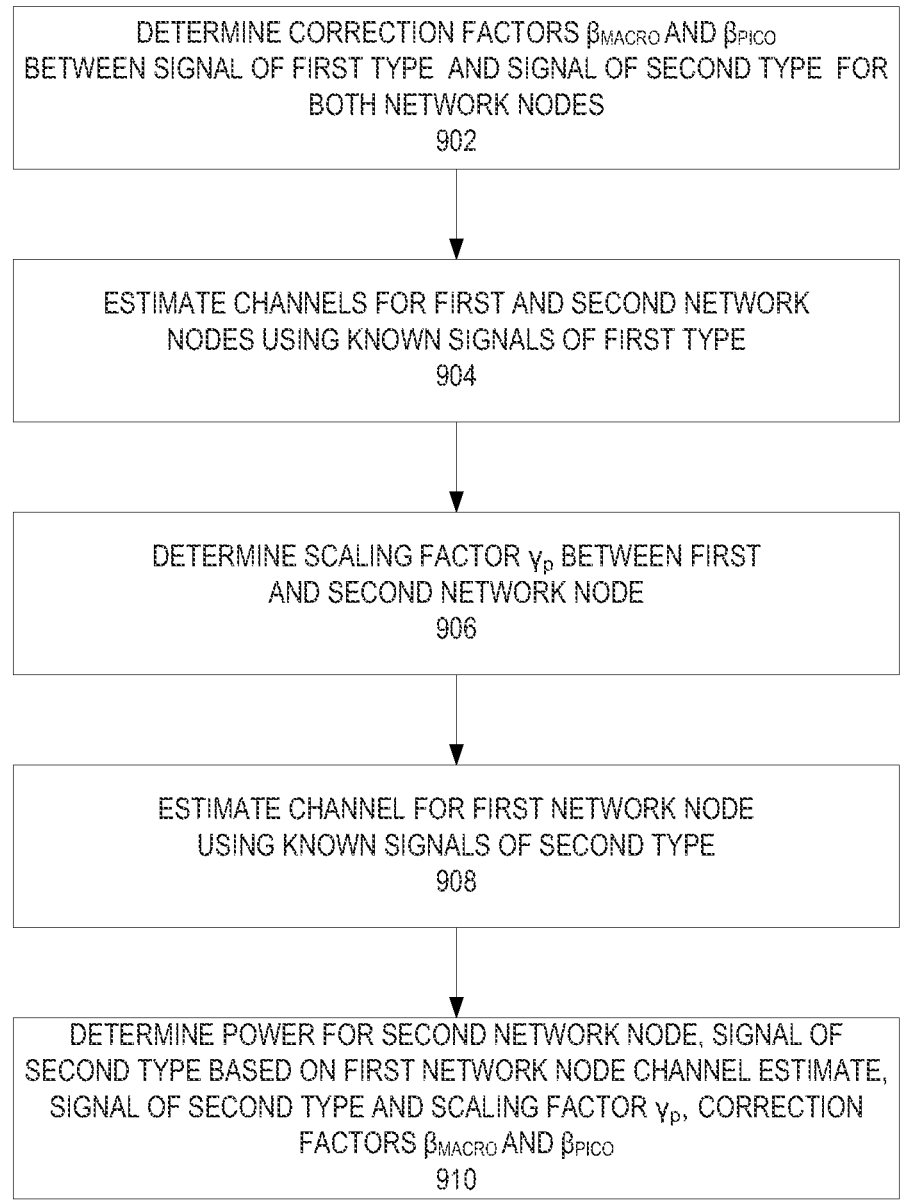
FIG. 8 is a flow-chart illustrating an exemplary signal estimation process using a correction factor.

FIG. 8 illustrates a second exemplary embodiment. In this embodiment, the power ratio between the signal of the first type and of the second type for the first radio network node is different from the power ratio between the signal of the first type and of the second type for the second radio network node. Assume the first radio network node 602 is a macro cell and the second radio network node 604 is a pico cell. Power ratios between a signal of the first type and a signal of the second type may be used as exemplary correction factors. The two correction factors $\beta_{macro}$ and $\beta_{pico}$ can be expressed as:

$$\beta_{macro} = \frac{p_{macro,SSS}}{p_{macro,CRS}} = \frac{p_{macro,SSS}}{RSRP_{macro}}$$

and $$\beta_{pico} = \frac{p_{pico,SSS}}{p_{pico,CRS}} = \frac{p_{pico,SSS}}{RSRP_{pico}}.$$

The correction factor used in the scaling approach may be calculated as:

$$\beta_p = \frac{\beta_{macro}}{\beta_{pico}}.$$

In FIG. 8, the wireless device may start by determining the power relation between the signal of the first type and of the second type for the two network nodes 602 and 604 (step 902). In step 904, the transceiver in the wireless device (jointly) estimates the radio channels associated with the links between the wireless device 606 and the first and second radio network nodes, 602 and 604, using known signals of the first type. In an LTE embodiment, signals of the first type may be Secondary Synchronization signals (SSS). In a non-limiting example, the scaling factor (in this example a power ratio) between the first signal of the first type from the pico cell and that from the macro cell can be calculated as:

$$\gamma_p = \frac{p_{pico,SSS}}{p_{macro,SSS}},$$

See step 906. The wireless device then estimates the channel for the first network node using a signal of the second type (e.g. CRSs), and measures RSRP on the CRS for the first network node (step 906) to obtain a reference estimate $\tilde{p}_{macro,CRS}$. Then the (virtual) RSRP for the pico cell, $p_{pico,CRS}$, may be determined based on the power scaling factor $\gamma_p$, correction factors $\beta_{macro}$ and $\beta_{pico}$, and the RSRP estimate $\tilde{p}_{macro,CRS}$ for the macro cell (step 910). The pico RSRP, $p_{pico,CRS}$, may be estimated as $$p_{pico,CRS} = \beta_p \cdot \gamma_p \cdot \tilde{p}_{macro,CRS} = \left(\frac{\beta_{macro}}{\beta_{pico}}\right) \cdot \left(\frac{p_{pico,SSS}}{p_{macro,SSS}}\right) \cdot \tilde{p}_{macro,CRS}.$$

See step 910. The RSRP measurements/estimates may then be used by the wireless device for determination of handover, for example.

In the above discussions, the wireless device 606 is configured to calculate the scaling factor based on measured signal power, signal quality or channel estimates. However, a network node may be configured to provide a scaling factor or adjustments to the scaling factor to the wireless device in support of the scaling approach.

Figure 9:
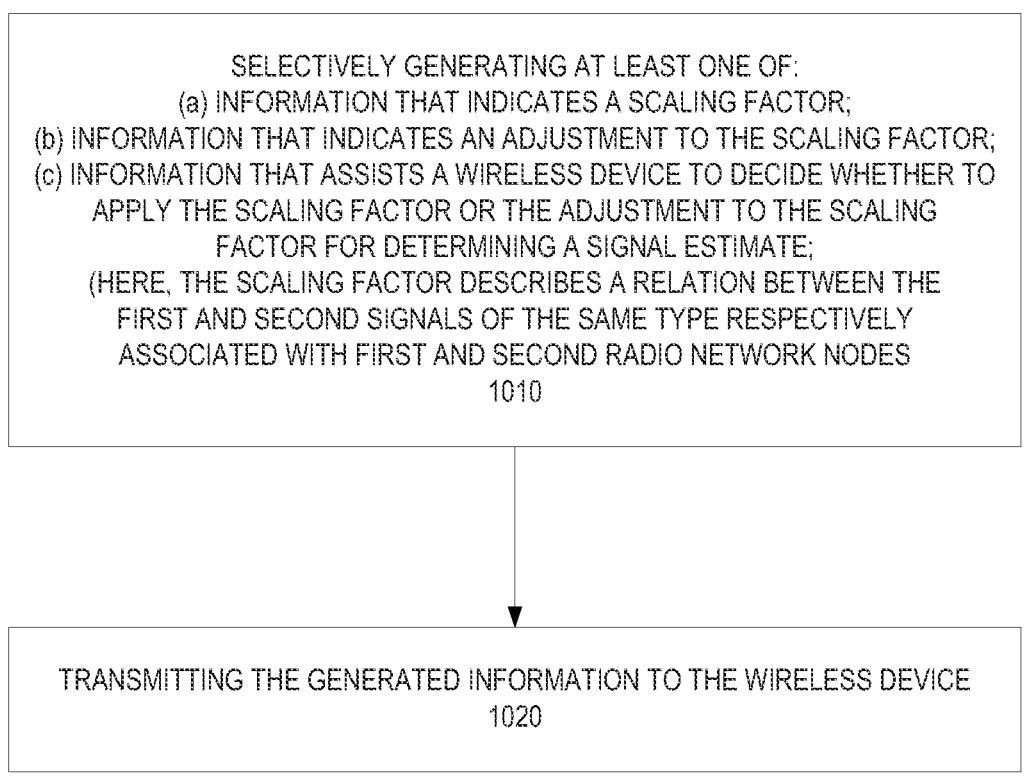
FIG. 9 is a flow-chart illustrating an exemplary network-assisted signal estimation process.

FIG. 9 is a flow chart illustrating an exemplary process implemented by a radio network node 602 or 604. In FIG. 9, the radio network node generates at least one of the following information or data (step 1010): information that indicates a scaling factor, information that indicates an adjustment to the scaling factor, and information that assists a wireless device to device whether to apply the scaling factor or the adjustment to the scaling factor for determining a signal estimate. The scaling factor describes a relation between the first and second signals of the same type respectively associated with the first and second radio network nodes. The radio network node then transmits the generated information towards a wireless device (step 1020).

In some embodiments, the network node selectively generates the above described information in response to receiving a capability information from the wireless device indicating that the wireless device is capable of applying the scaling factor or the adjustment to the scaling factor for determining the signal estimate. In some embodiments, the exemplary process in FIG. 9 further comprises transmitting capability information to a node indicating whether or not the network node is capable of generating and transmitting the above described information.

To enable the network assistance to the wireless device in aid of the scaling approach, additional signaling means may be provisioned to allow a radio network node to transmit a scaling factor and/or correction factor(s) to the wireless devices. Signaling means are also needed in at least some embodiments to inform the network node and the wireless device of the new capabilities in obtaining signal estimates using a scaling approach. Finally, signal means are needed in some embodiments to report results from a scaling approach.

A radio network node may obtain the scaling factor and/or correction factor, e.g., based on location, UL measurements, timing or timing difference measurements for the wireless device, or other information. It may then also signal a scaling factor and/or correction factor(s) to a wireless device, e.g., in the assistance data (e.g., associated with eICIC, inter-cell interference coordination, assistance data for enhanced receiver for handling aggressor interference, assistance data for improved signal detection and measurement in general, etc.). The signaled scaling factor can be an "approximate" scaling factor, which may be further refined by the wireless device. Either the refined or the approximate scaling factor may then be used by the wireless device implementing embodiments described herein.

The scaling factor may also be signaled to another network node, e.g., eNodeB or a core network node. For example, when scaling and/or correction factors are known to the radio network node receiving the reference estimate, the node itself may obtain the estimate of the weak signal(s) using this information. The result may also be signaled to another node.

Also an indication may be further associated with the scaling and/or correction factor, indicating to which signal a scaling or correction factor is related, e.g., RSRP, PRS, etc. There may also be pre-defined rules to define the factors, e.g., based on the antenna port information, or to allow inclusion of multiple scaling and/or correction factor(s) related to multiple signals types. This may also be useful when a measurement for a specific signal type is provided by the measuring/receiving radio node. The measuring/receiving radio node may also signal the obtained scaling and/or correction factors.

The scaling factor and/or correction factor(s) may also be associated with specific time and/or frequency resource. Hence, in one example, a radio network node may provide to the wireless device or a network node data describing or indicating time- and/or frequency resource with which the scaling factor and/or correction factor(s) are associated. In another example, the time-frequency resources may be indicated by a restricted measurement pattern configured for inter-cell interference coordination, and a scaling factor may or may not be signaled.

At least one of the time and/or frequency resources and the scaling factor may also be derived based on a pre-defined rule.

Signaling is also needed in at least some embodiments to inform a radio network node of the wireless device's new capabilities related to the ability to use the scaling approach. The new capabilities may be also communicated by the wireless device to at least one other node (e.g., eNodeB, positioning node, another wireless device). The wireless device with such capability may be capable of operating in higher-interference conditions than those without such capability. However, this may require assistance data for interference handling that meets certain criteria and conditions which may be not necessary for wireless devices without such capability (e.g., synchronization/misalignment information).

This capability information may be used, e.g., when configuring radio measurements for the wireless device, when configuring mobility-related parameters for the wireless device (e.g., cell selection/reselection parameters), when configuring assistance data for assisting the wireless device in performing measurements or channel estimation, or when deciding on the need to configure transmissions of signals of the second type.

There may also be radio network capability related to enhanced support of the scaling-based signal estimation approach. In one example, a radio network node without such capability may be not able to provide additional support for a wireless device which is using the scaling-based estimation approach, e.g., signal a scaling factor and/or a correction factor. The radio network node may also signal its capability to another network node or even to a wireless device.

The wireless device performing estimates for at least one signal based on the scaling approach (e.g., as a described herein) may send the result to a network node (e.g., eNodeB or positioning node) or another wireless device. The result may comprise any one or more: the estimate obtained based on the scaling approach, the scaling factor, correction factor, the information about the reference estimate (e.g., signal type), information or indication about time-frequency resources used for estimating scaling factor and/or reference estimate (e.g., "low-interference subframes" or "normal/unprotected subframes").

In one example, the estimate obtained based on the scaling approach described herein, e.g., the channel estimate, received signal power estimate, or received signal quality estimate, is signaled to another node, e.g., eNodeB, positioning node, MDT node, SON node, or another wireless device.

The estimate may also be used to form a pre-defined measurement (e.g., RSRP or RSRQ performed on CRS), which may be provided to another node and may in general be used for radio resource management (RRM) tasks, mobility, positioning, radio network planning and optimization, etc.

The estimate may also be used by the wireless device for uplink power control which is generally based on path loss measurements, and hereby enable more accurate uplink power control, particularly in the presence of aggressor interference.

The wireless device may also estimate the quality of the obtained estimate. The estimated quality may be signaled to another node or may be used for internal decisions by the wireless device, e.g., report a measurement based on the obtained estimate if the quality of the obtained estimate is above a threshold.

Figure 10:
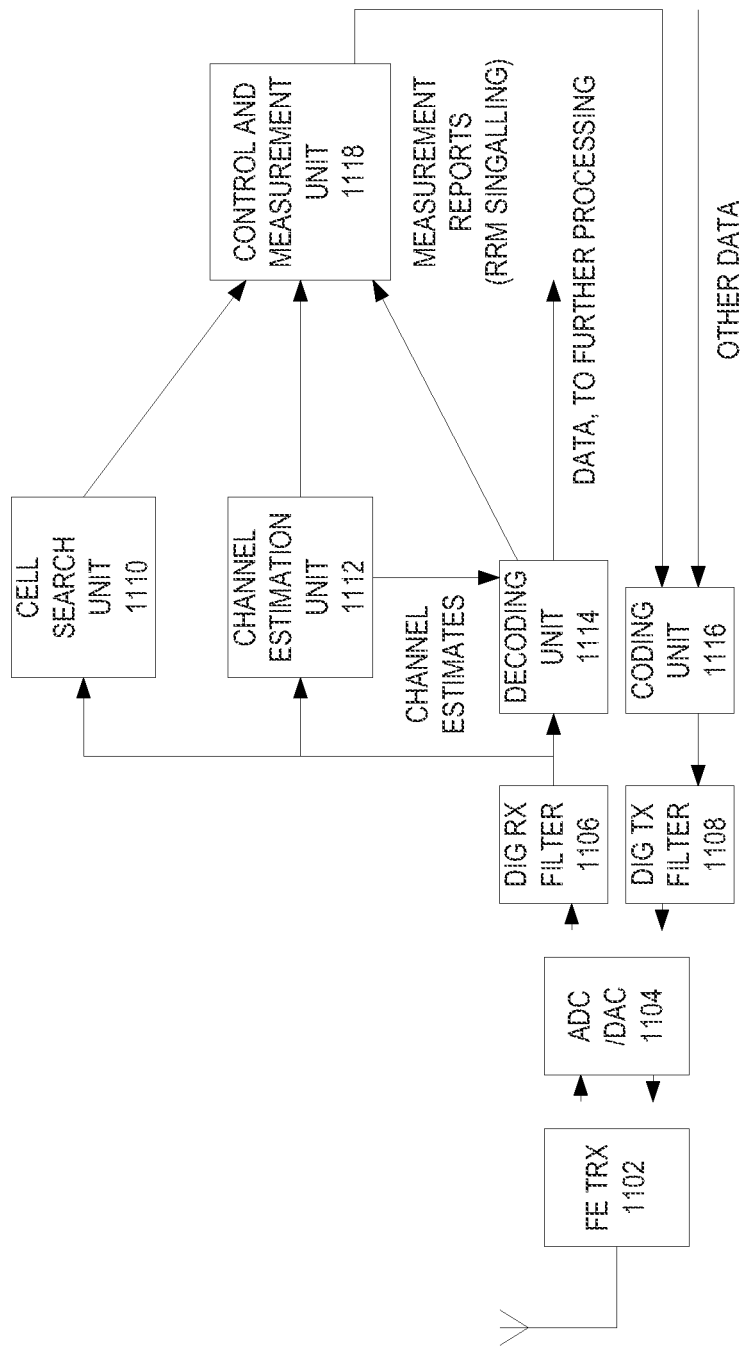
FIG. 10 illustrates an exemplary wireless device configured for channel estimation and measurement report.

FIG. 10 illustrates a block diagram of a wireless device or UE 1100 operating according to an example embodiment of the invention is shown. The device includes an antenna unit 1101, a front end transceiver unit (FE TRX) 1102, down converting (for RX) and up converting (for TX) the signal to radio carrier frequency (not shown) and a digital to analog and analog to digital unit (DAC/ADC) 1104 that is responsible to converting the signal from analog to digital baseband signal (RX) and vice versa (for TX). Furthermore it includes a digital RX filter 1106 and a digital TX filter 1108, both configured to process the digital signal to desired form.

The UE 1100 further comprises a receiver part and a transmitter part. The receiver portion of the wireless device 1100 includes a cell search unit 1110, a channel estimation unit 1112, a decoding unit 1114, and a control and measurement unit 1118. The cell search unit 1110 is responsible for detecting new cells and for synchronizing with the network nodes of the detected new cells. The channel estimation unit 1112 is configured to estimate the radio channels and is capable of estimating channel individually as well as multiple channels jointly. The decoding unit 1114 is configured for decoding the received signals and for generating data for further processing. Information from the cell search unit 1110, the channel estimation unit 1112 and the decoding unit 1114 are then fed to the measurement and control unit 1118. The measurement and control unit 1118 is configured for generating the reference estimates or measurement reports described above. The reference estimates may be an RSRP or other signal strength estimate.

In the transmitter part of the wireless device 1100, there is a coding unit 1116, which is configured for coding a data signal according to a desired format for transmission to a network node.

It is noted that the wireless device 1100 is shown as an example embodiment. The wireless device 1100 may include more units than described. In some mobiles, all the units described above may be in a "single chip". For example, the channel estimation unit 1112 and the coding/decoding units 1114 and 1115 may be included in the same chip as the TRX unit 1102 and the ADC/DAC unit 1104. Of course, those units may be included in separate chips as well.

Figure 11:
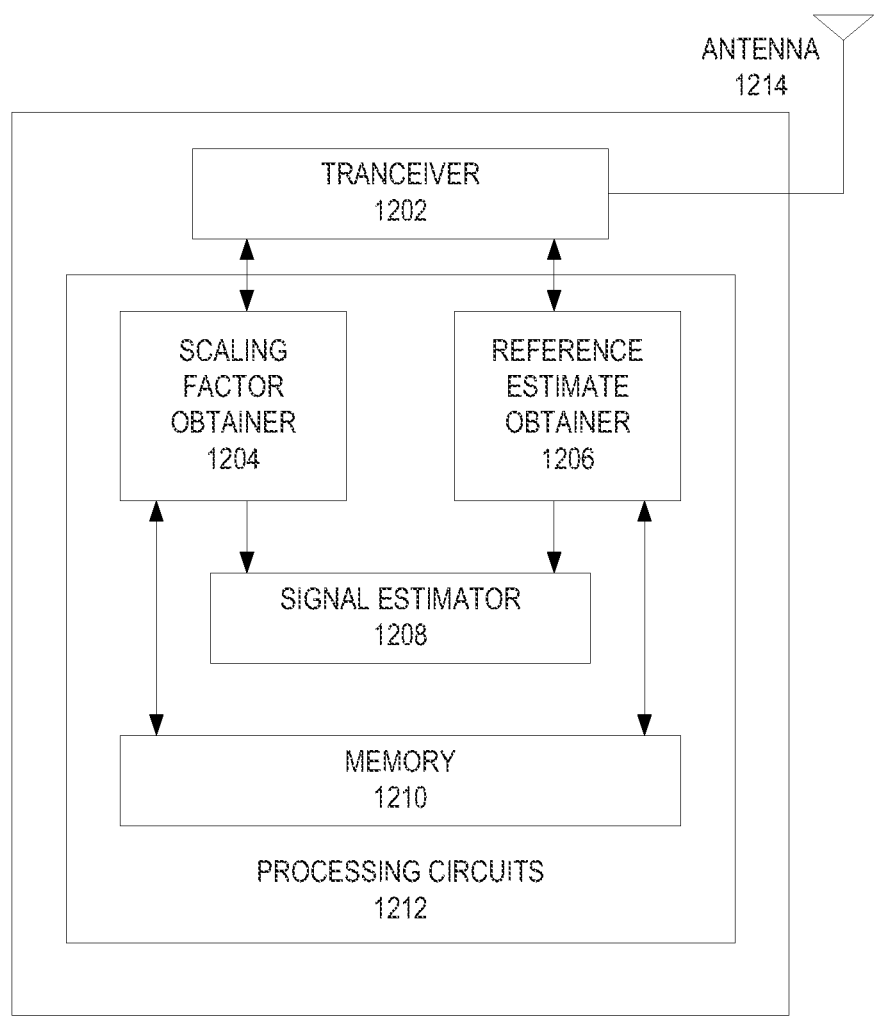
FIG. 11 illustrates an exemplary wireless device configured to support the signal estimation processes disclosed herein.

FIG. 11 illustrates a wireless device 1100 configured according to the embodiments described above. The wireless device 1100 comprises a transceiver 1202 and one or more processing circuits 1212. The transceiver 1202 is connected to one or more antenna systems 1214. The one or more processing circuits 1212 comprise a scaling factor obtainer 1204, a reference estimate obtainer 1206, a signal estimator 1208 and memory 1210. The scaling factor obtainer 1204 is configured to obtain a scaling factor as described above. The reference estimate obtainer 1206 is configured to obtain the reference estimate as described above. Both the scaling factor and the reference estimate are input into the signal estimator 1208. The signal estimator 1208 is configured to determine a signal estimate for a signal of the second type based on the reference estimate and the scaling factor as described above. In some embodiments, the memory 1210 is configured to interface with the scaling factor obtainer 1204, the reference estimate obtainer 1206, and the signal estimator 1208 for storing data that are used in the scaling-based cell measurement method.

Figure 12:
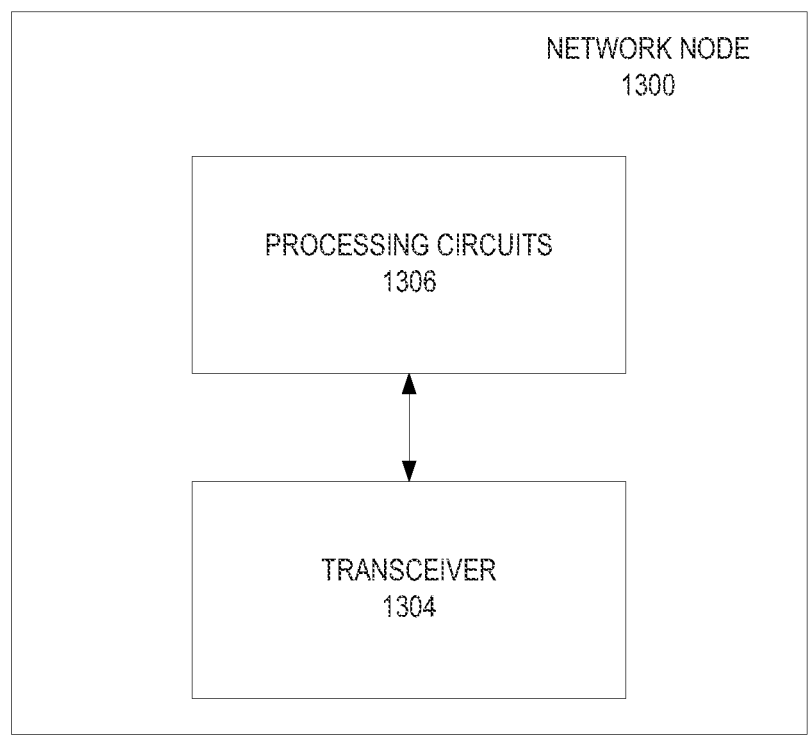
FIG. 12 illustrates an exemplary network node configured to support the signal estimation techniques disclosed herein.

FIG. 12 illustrates a network node 1300 configured to assist a wireless device to determine a signal estimate for a signal in a wireless communication system, in some embodiments, as described above. The network node 1300 comprises one or more processing circuits 1306 and a transceiver 1304. The one or more processing circuits 1306 are configured to generate at least one of the following information or data: (a) information that indicates a scaling factor; (b) information that indicates an adjustment to the scaling factor; and (c) information that assists a wireless device to decide whether to apply the scaling factor or the adjustment to the scaling factor for determining a signal estimate. The one more processing circuits 1306 may be configured to selectively generate at least one of the above listed information in response to receiving capability information from the wireless device 606. The capability information indicates that the wireless device 606 is capable of applying the scaling factor or the adjustment to the scaling factor for determining the signal estimate.

In FIG. 12, the transceiver 1304 is configured to transmit the generated information to the wireless device. The transceiver 1304 may be further configured to transmit to a node capability information that indicates whether or not the network node 1300 is capable of generating and transmitting at least one of the above described information.

Of course, any of the embodiments disclosed herein can be implemented alone or be combined with any other embodiments, entirely or partially.

The foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method implemented by a wireless device in a wireless communication system, comprising:
    obtaining a scaling factor that describes a relation between signal estimates for first and second signals of a first type;
    obtaining a reference signal estimate that comprises a signal estimate for a first signal of a second type; and
    selectively determining at the wireless device a signal estimate for a second signal of the second type by scaling the reference signal estimate by the scaling factor;
    wherein the first signals of the first and second type are associated with a first radio network node and the second signals of the first and second type are associated with a second radio network node;
    wherein obtaining the scaling factor comprises computing the signal estimates for the first and second signals of the first type; and
    wherein computing the signal estimates comprises determining if the first and second signals of the first type are substantially time-aligned, and, if so, selecting a joint channel estimation approach from among multiple possible channel estimation approaches for estimating channels associated with those signals.

2. The method of claim 1, wherein the first and second signals of the first type are associated with time and/or frequency resources with a specific property.

3. The method of claim 1, wherein the signal estimate for a signal is one of: a channel estimate of a channel associated with the signal, a power estimate of the signal, and a signal quality estimate of the signal.

4. The method of claim 1, wherein obtaining the scaling factor comprises receiving the first and second signals of the first type, and calculating the scaling factor as a ratio of the computed signal estimate for the second signal of the first type to the computed signal estimate for the first signal of the first type.

5. The method of claim 1, further comprising receiving information from a network node, wherein the received information comprises at least one of: information that indicates the scaling factor, information that indicates an adjustment to the scaling factor, and information that assists the wireless device to determine whether to apply the scaling factor or the adjustment to the scaling factor for determining the signal estimate for the second signal of the second type.

6. The method of claim 1, further comprising transmitting to a network node capability information indicating whether or not the wireless device is capable of determining the signal estimate for the second signal of the second type by said scaling.

7. The method of claim 1, wherein selectively determining the signal estimate for the second signal of the second type by said scaling comprises determining that signal estimate by said scaling in response to the wireless device determining that the second signal of the second type has a density in time, frequency, or both that is lower than a defined threshold.

8. The method of claim 1, wherein selectively determining the signal estimate for the second signal of the second type by said scaling comprises determining that signal estimate by said scaling in response to the wireless device determining that the first radio network node is functioning as an aggressor with respect to the second radio network node.

9. The method of claim 1, wherein selectively determining the signal estimate for the second signal of the second type by said scaling comprises determining that signal estimate by said scaling in response to the wireless device being in a low power or low activity state.

10. A method implemented by a wireless device in a wireless communication system, comprising:
    obtaining a scaling factor that describes a relation between signal estimates for first and second signals of a first type;
    obtaining a reference signal estimate that comprises a signal estimate for a first signal of a second type; and
    selectively determining at the wireless device a signal estimate for a second signal of the second type by scaling the reference signal estimate by the scaling factor;
    wherein the first signals of the first and second type are associated with a first radio network node and the second signals of the first and second type are associated with a second radio network node;
    wherein selectively determining the signal estimate for the second signal of the second type by said scaling comprises determining that signal estimate by said scaling in response to the wireless device determining that the first signal of the second type is not available for measurement at the wireless device; and
    wherein obtaining the reference signal estimate comprises obtaining the signal estimate for the first signal of the second type as a virtual signal estimate that is generally associated with a signal of the second type.

11. The method of claim 1, further comprising obtaining a correction factor that describes a relation between the first and second types of signals at the first and second radio network nodes, and wherein determining the signal estimate for the second signal of the second type further comprises adjusting the scaling factor by the correction factor.

12. The method of claim 11, wherein obtaining the correction factor comprises computing the correction factor based on one of the following:

a difference between a first power ratio of the first signal of the first type and the first signal of the second type and a second power ratio of the second signal of the first type and the second signal of the second type;
bandwidth information associated with the first and second radio network nodes;
power classes associated with the first and second radio network nodes; and
the number of transmit antennas associated with the first and second radio network nodes.

13. The method of claim 1, wherein signals of the first type are synchronization signals and signals of the second type are cell-specific reference signals.

14. The method of claim 1, wherein signals of the first type are cell-specific reference signals and signals of the second type are synchronization signals.

15. A wireless device in a wireless communication system, comprising:
a transceiver configured to transmit and receive signals from a first and a second radio network node; and
one or more processing circuits configured to:
obtain a scaling factor that describes a relation between signal estimates for first and second signals of a first type by computing the signal estimates for the first and second signals;
obtain a reference signal estimate that comprises a signal estimate for a first signal of a second type; and
selectively determine a signal estimate for a second signal of the second type by scaling the reference signal estimate by the scaling factor;
wherein the first signals of the first and second type are associated with the first radio network node and the second signals of the first and second type are associated with the second radio network node; and
wherein the one or more processing circuits are configured to compute the signal estimates by determining if the first and second signals of the first type are substantially time-aligned, and, if so, configured to select a joint channel estimation approach from among multiple possible channel estimation approaches for estimating channels associated with those signals.

16. The wireless device of claim 15, wherein the first and second signals of the first type are associated with time and/or frequency resources with a specific property.

17. The wireless device of claim 15, wherein the one or more processing circuits are configured to obtain the scaling factor by receiving the first and second signals of the first type, and calculate the scaling factor as a ratio of the computed signal estimate for the second signal of the first type to the computed signal estimate for the first signal of the first type.

18. A wireless device in a wireless communication system, comprising:
a transceiver configured to transmit and receive signals from a first and a second radio network node; and
one or more processing circuits configured to:
obtain a scaling factor that describes a relation between signal estimates for first and second signals of a first type;
obtain a reference signal estimate that comprises a signal estimate for a first signal of a second type; and
selectively determine a signal estimate for a second signal of the second type by scaling the reference signal estimate by the scaling factor;
wherein the first signals of the first and second type are associated with the first radio network node and the second signals of the first and second type are associated with the second radio network node; and
wherein the one or more processing circuits are configured to selectively determine the signal estimate for the second signal of the second type by said scaling in response to the wireless device determining that the second signal of the second type has a density in time, frequency, or both that is lower than a defined threshold.

19. The wireless device of claim 15, wherein the one or more processing circuits are configured to selectively determine the signal estimate for the second signal of the second type by said scaling in response to the wireless device determining that the first radio network node is functioning as an aggressor with respect to the second radio network node.

20. The wireless device of claim 15, wherein the one or more processing circuits are configured to selectively determine the signal estimate for the second signal of the second type by said scaling in response to the wireless device being in a low power or low activity state.

21. The wireless device of claim 15, wherein the one or more processing circuits are configured to selectively determine the signal estimate for the second signal of the second type by said scaling in response to the wireless device determining that the first signal of the second type is not available for measurement at the wireless device, and to obtain the reference signal estimate by obtaining the signal estimate for the first signal of the second type as a virtual signal estimate that is generally associated with a signal of the second type.

22. A wireless device in a wireless communication system, comprising:
a transceiver configured to transmit and receive signals from a first and a second radio network node; and
one or more processing circuits configured to:
obtain a scaling factor that describes a relation between signal estimates for first and second signals of a first type;
obtain a reference signal estimate that comprises a signal estimate for a first signal of a second type; and
selectively determine a signal estimate for a second signal of the second type by scaling the reference signal estimate by the scaling factor;
wherein the first signals of the first and second type are associated with the first radio network node and the second signals of the first and second type are associated with the second radio network node; and
wherein the one or more processing circuits are further configured to obtain a correction factor that describes a relation between the first and second types of signals at the first and second radio network nodes, and to determine the signal estimate for the second signal of the second type by adjusting the scaling factor by the correction factor.

23. The wireless device of claim 15, wherein signals of the first type are synchronization signals and signals of the second type are cell-specific reference signals.

* * * * *